United States Patent
Kamada

(10) Patent No.: US 10,689,067 B2
(45) Date of Patent: Jun. 23, 2020

(54) BICYCLE SPROCKET ASSEMBLY AND BICYCLE DRIVE TRAIN

(71) Applicant: SHIMANO INC., Sakai (JP)

(72) Inventor: Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 310 days.

(21) Appl. No.: 15/448,589

(22) Filed: Mar. 3, 2017

(65) Prior Publication Data

US 2018/0251189 A1    Sep. 6, 2018

(51) Int. Cl.
  *B62M 9/10*      (2006.01)
  *F16H 55/30*     (2006.01)
  *B62M 9/12*      (2006.01)

(52) U.S. Cl.
  CPC .............. *B62M 9/10* (2013.01); *B62M 9/105* (2013.01); *B62M 9/12* (2013.01); *F16H 55/30* (2013.01)

(58) Field of Classification Search
  CPC .......... B62M 9/10; B62M 9/12; B62M 9/105; F16H 55/30
  See application file for complete search history.

(56) References Cited

U.S. PATENT DOCUMENTS

| | | | |
|---|---|---|---|
| 4,889,521 A | 12/1989 | Nagano | |
| 5,716,297 A * | 2/1998 | Bodmer | B62M 9/10 474/160 |
| 5,954,604 A | 9/1999 | Nakamura | |
| 6,340,338 B1 * | 1/2002 | Kamada | B62M 9/10 474/152 |
| 2004/0259675 A1 * | 12/2004 | Chattin | B62M 9/10 474/160 |
| 2005/0079940 A1 * | 4/2005 | Reiter | B62M 9/10 474/160 |
| 2006/0154767 A1 * | 7/2006 | Kamada | B62M 9/10 474/160 |
| 2007/0060428 A1 * | 3/2007 | Meggiolan | B62M 9/10 474/160 |

(Continued)

FOREIGN PATENT DOCUMENTS

| CN | 102442403 | 5/2012 |
|---|---|---|
| CN | 104973204 | 10/2015 |

(Continued)

*Primary Examiner* — Michael R Mansen
*Assistant Examiner* — Raveen J Dias
(74) *Attorney, Agent, or Firm* — Mori & Ward, LLP

(57) ABSTRACT

A bicycle sprocket assembly comprises a first sprocket and a second sprocket. The first sprocket includes a first sprocket body, first sprocket teeth, and a first pitch circle. The first pitch circle has a first diameter. The second sprocket includes a second sprocket body, second sprocket teeth, and a second pitch circle. The first sprocket teeth include a large-sprocket downshifting tooth and an additional large-sprocket downshifting tooth. The second sprocket teeth include a first small-sprocket downshifting tooth, a second small-sprocket downshifting tooth, a first adjacent tooth, and a second adjacent tooth. A circumferential area is defined from a driving surface of the first adjacent tooth to a non-driving surface of the second adjacent tooth in a driving rotational direction about a rotational center axis when viewed in an axial direction. The large-sprocket downshifting tooth is disposed in the circumferential area when viewed in the axial direction.

20 Claims, 29 Drawing Sheets

(56) References Cited

U.S. PATENT DOCUMENTS

| | | | |
|---|---|---|---|
| 2007/0173364 A1* | 7/2007 | Renshaw | F16H 55/30 |
| | | | 474/160 |
| 2009/0042680 A1 | 2/2009 | Valle | |
| 2009/0098966 A1* | 4/2009 | Kamada | B62M 9/10 |
| | | | 474/160 |
| 2009/0258740 A1* | 10/2009 | Valle | B62M 9/10 |
| | | | 474/160 |
| 2011/0092327 A1* | 4/2011 | Oishi | B62M 9/10 |
| | | | 474/160 |
| 2012/0083372 A1 | 4/2012 | Yamaguchi et al. | |
| 2012/0119565 A1* | 5/2012 | Kamada | B62M 9/10 |
| | | | 301/110.5 |
| 2015/0285358 A1* | 10/2015 | Numata | F16H 55/08 |
| | | | 474/160 |
| 2015/0285363 A1 | 10/2015 | Pfeiffer | |
| 2016/0059930 A1* | 3/2016 | Fukunaga | B62M 9/10 |
| | | | 474/160 |
| 2016/0207590 A1 | 7/2016 | Fukumori | |
| 2016/0236750 A1* | 8/2016 | Emura | B62M 9/105 |
| 2016/0280326 A1 | 9/2016 | Braedt et al. | |
| 2016/0362159 A1* | 12/2016 | Braedt | B62M 9/10 |
| 2017/0183060 A1* | 6/2017 | Braedt | B62M 9/10 |
| 2017/0217539 A1* | 8/2017 | Braedt | B62M 9/121 |

FOREIGN PATENT DOCUMENTS

| | | |
|---|---|---|
| CN | 105799856 | 7/2016 |
| CN | 106005232 | 10/2016 |

\* cited by examiner

| SPEED SPROCKET | TOTAL NUMBER OF TEETH | OP1 | OP2 | OP3 | OP4 | OP5 | OP6 | OP7 | OP8 | OP9 | OP10 |
|---|---|---|---|---|---|---|---|---|---|---|---|
| | | | | TND1 = 2 | | | | TND1 = 3 | | | |
| SS1 | 36 | | | | | | | | | | 1ST |
| SS2 | 33 | | | | | | | | | 1ST | 2ND |
| SS3 | 30 | | | | | | | | 1ST | 2ND | 3RD |
| SS4 | 27 | | | | | | | 1ST | 2ND | 3RD | |
| SS5 | 24 | | | | | | 1ST | 2ND | 3RD | | |
| SS6 | 22 | | | | | 1ST | 2ND | 3RD | | | |
| SS7 | 20 | | | | 1ST | 2ND | 3RD | | | | |
| SS8 | 18 | | | 1ST | 2ND | 3RD | | | | | |
| SS9 | 16 | | 1ST | 2ND | 3RD | | | | | | |
| SS10 | 14 | 1ST | 2ND | 3RD | | | | | | | |
| SS11 | 12 | 2ND | 3RD | | | | | | | | |
| SS12 | 10 | 3RD | | | | | | | | | |

*FIG. 13*

| SPEED SPROCKET | TOTAL NUMBER OF TEETH | OP1 | OP2 TND2=2 | OP3 TND2=3 | OP4 TND2=4 | OP5 TND2=3 | OP6 | OP7 TND2=4 | OP8 | OP9 TND2=5 | OP10 |
|---|---|---|---|---|---|---|---|---|---|---|---|
| SS201 | 50 | | | | | | | | | | 1ST |
| SS202 | 45 | | | | | | | | | 1ST | 2ND |
| SS203 | 40 | | | | | | | | 1ST | 2ND | 3RD |
| SS204 | 36 | | | | | | | 1ST | 2ND | 3RD | |
| SS205 | 32 | | | | | | 1ST | 2ND | 3RD | | |
| SS206 | 28 | | | | | 1ST | 2ND | 3RD | | | |
| SS207 | 25 | | | | 1ST | 2ND | 3RD | | | | |
| SS208 | 21 | | | 1ST | 2ND | 3RD | | | | | |
| SS209 | 18 | | 1ST | 2ND | 3RD | | | | | | |
| SS210 | 16 | 1ST | 2ND | 3RD | | | | | | | |
| SS211 | 14 | 2ND | 3RD | | | | | | | | |
| SS212 | 12 | 3RD | | | | | | | | | |

*FIG. 19*

BICYCLE SPROCKET ASSEMBLY AND BICYCLE DRIVE TRAIN

BACKGROUND OF THE INVENTION

Field of the Invention

The present invention relates to a bicycle sprocket assembly and a bicycle drive train.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket assembly comprises a first sprocket and a second sprocket. The first sprocket includes a first sprocket body, first sprocket teeth, and a first pitch circle. The first sprocket teeth extend radially outwardly from an outer periphery of the first sprocket body. The first pitch circle has a first diameter. The second sprocket includes a second sprocket body, second sprocket teeth, and a second pitch circle. The second sprocket teeth extend radially outwardly from an outer periphery of the second sprocket body. The second pitch circle has a second diameter that is smaller than the first diameter. The second sprocket is adjacent to the first sprocket without another sprocket between the first sprocket and the second sprocket in an axial direction parallel to a rotational center axis of the bicycle sprocket assembly. The first sprocket teeth include a large-sprocket downshifting tooth to first receive a bicycle chain from the second sprocket in a first chain phase state in which the bicycle chain is shifted from the second sprocket to the first sprocket. The first sprocket teeth include an additional large-sprocket downshifting tooth to first receive the bicycle chain from the second sprocket in a second chain phase state in which the bicycle chain is shifted from the second sprocket to the first sprocket. The second chain phase state is different from the first chain phase state. The additional large-sprocket downshifting tooth is adjacent to the large-sprocket downshifting tooth without another tooth between the large-sprocket downshifting tooth and the additional large-sprocket downshifting tooth. The additional large-sprocket downshifting tooth is disposed on an upstream side of the large-sprocket downshifting tooth in a driving rotational direction in which the bicycle sprocket assembly is rotated about the rotational center axis during pedaling. The second sprocket teeth include a first small-sprocket downshifting tooth to facilitate a downshifting operation in which the bicycle chain is shifted from a third sprocket to the second sprocket. The third sprocket is adjacent to the second sprocket without another sprocket between the second sprocket and the third sprocket in the axial direction. The second sprocket teeth include a second small-sprocket downshifting tooth to facilitate a downshifting operation in which the bicycle chain is shifted from the third sprocket to the second sprocket. The second small-sprocket downshifting tooth is spaced apart from the first small-sprocket downshifting tooth in the circumferential direction. The second sprocket teeth include a first adjacent tooth adjacent to the first small-sprocket downshifting tooth without another tooth between the first small-sprocket downshifting tooth and the first adjacent tooth in the circumferential direction. The first adjacent tooth is disposed on an upstream side of the first small-sprocket downshifting tooth in the driving rotational direction. The second sprocket teeth include a second adjacent tooth adjacent to the second small-sprocket downshifting tooth without another tooth between the second small-sprocket downshifting tooth and the second adjacent tooth in the circumferential direction. The second adjacent tooth is disposed on a downstream side of the second small-sprocket downshifting tooth in the driving rotational direction. A circumferential area is defined from a driving surface of the first adjacent tooth to a non-driving surface of the second adjacent tooth in the driving rotational direction about the rotational center axis when viewed in the axial direction. The circumferential area has an angle equal to or smaller than 180 degrees about the rotational center axis. The large-sprocket downshifting tooth is disposed in the circumferential area when viewed in the axial direction.

With the bicycle sprocket assembly according to the first aspect, it is possible to smoothen a multiple downshifting.

In accordance with a second aspect of the present invention, the bicycle sprocket assembly according to the first aspect is configured so that a total number of the second sprocket teeth is smaller than a total number of the first sprocket teeth by a tooth-number difference that is equal to or less than five.

With the bicycle sprocket assembly according to the second aspect, it is possible to effectively smoothen the multiple downshifting.

In accordance with a third aspect of the present invention, the bicycle sprocket assembly according to the second aspect is configured so that the tooth-number difference is equal to three.

With the bicycle sprocket assembly according to the third aspect, it is possible to more effectively smoothen the multiple downshifting.

In accordance with a fourth aspect of the present invention, the bicycle sprocket assembly according to the second aspect is configured so that the tooth-number difference is equal to two.

With the bicycle sprocket assembly according to the fourth aspect, it is possible to more effectively smoothen the multiple downshifting.

In accordance with a fifth aspect of the present invention, the bicycle sprocket assembly according to any one of the first to fourth aspects is configured so that a total number of the first sprocket teeth is equal to or less than 24.

With the bicycle sprocket assembly according to the fifth aspect, it is possible to effectively smoothen the multiple downshifting.

In accordance with a sixth aspect of the present invention, the bicycle sprocket assembly according to any one of the first to fifth aspects is configured so that the first sprocket teeth include at least one first tooth and at least one second tooth. The at least one first tooth has a first maximum axial width and a first center plane. The first maximum axial width is defined in an axial direction parallel to the rotational center axis. The first center plane is defined to bisect the first maximum axial width. The at least one second tooth has a second maximum axial and a second center plane. The second maximum axial width is defined in the axial direction. The second center plane is defined to bisect the second maximum axial width. The first center plane is offset from the second center plane in the axial direction.

With the bicycle sprocket assembly according to the sixth aspect, it is possible to improve a chain-holding performance of the bicycle sprocket assembly with smoothening the multiple downshifting.

In accordance with a seventh aspect of the present invention, the bicycle sprocket assembly according to any one of the first to sixth aspects further comprising the third sprocket. The third sprocket comprises a third sprocket body and third sprocket teeth extending radially outwardly from an outer periphery of the third sprocket body. A total number of the third sprocket teeth is equal to or smaller than 10.

With the bicycle sprocket assembly according to the seventh aspect, it is possible to widen a gear range of the bicycle sprocket assembly with smoothening the multiple downshifting.

In accordance with an eighth aspect of the present invention, the bicycle sprocket assembly according to any one of the first to seventh aspects further comprising a smallest sprocket having a minimum total number of sprocket teeth which is equal to or smaller than 10.

With the bicycle sprocket assembly according to the eighth aspect, it is possible to widen a gear range of the bicycle sprocket assembly with smoothening the multiple downshifting.

In accordance with a ninth aspect of the present invention, the bicycle sprocket assembly according to any one of the first to eighth aspects further comprising a largest sprocket having a maximum total number of sprocket teeth which is equal to or larger than 46.

With the bicycle sprocket assembly according to the ninth aspect, it is possible to widen a gear range of the bicycle sprocket assembly with smoothening the multiple downshifting.

In accordance with a tenth aspect of the present invention, the bicycle sprocket assembly according to the ninth aspect is configured so that the maximum total number of sprocket teeth is equal to or larger than 50.

With the bicycle sprocket assembly according to the tenth aspect, it is possible to widen a gear range of the bicycle sprocket assembly with smoothening the multiple downshifting.

In accordance with an eleventh aspect of the present invention, a bicycle sprocket assembly comprises a first sprocket and a second sprocket. The first sprocket includes a first sprocket body, first sprocket teeth, and a first pitch circle. The first sprocket teeth extend radially outwardly from an outer periphery of the first sprocket body. A total number of the first sprocket teeth is equal to or less than 24. The first pitch circle has a first diameter. The second sprocket includes a second sprocket body, second sprocket teeth, and a second pitch circle. The second sprocket teeth extend radially outwardly from an outer periphery of the second sprocket body. The second pitch circle has a second diameter that is smaller than the first diameter. The second sprocket is adjacent to the first sprocket without another sprocket between the first sprocket and the second sprocket in an axial direction parallel to a rotational center axis of the bicycle sprocket assembly. The first sprocket teeth include a large-sprocket downshifting tooth to first receive a bicycle chain from the second sprocket in a first chain phase state in which the bicycle chain is shifted from the second sprocket to the first sprocket. The second sprocket teeth include a first small-sprocket downshifting tooth to facilitate a downshifting operation in which the bicycle chain is shifted from a third sprocket to the second sprocket. The third sprocket is adjacent to the second sprocket without another sprocket between the second sprocket and the third sprocket in the axial direction. The second sprocket teeth include a second small-sprocket downshifting tooth to facilitate a downshifting operation in which the bicycle chain is shifted from the third sprocket to the second sprocket. The second small-sprocket downshifting tooth is spaced apart from the first small-sprocket downshifting tooth in the circumferential direction. The second sprocket teeth include a first adjacent tooth adjacent to the first small-sprocket downshifting tooth without another tooth between the first small-sprocket downshifting tooth and the first adjacent tooth in the circumferential direction. The first adjacent tooth is disposed on an upstream side of the first small-sprocket downshifting tooth in the driving rotational direction. The second sprocket teeth include a second adjacent tooth adjacent to the second small-sprocket downshifting tooth without another tooth between the second small-sprocket downshifting tooth and the second adjacent tooth in the circumferential direction. The second adjacent tooth is disposed on a downstream side of the second small-sprocket downshifting tooth in the driving rotational direction. A circumferential area is defined from a driving surface of the first adjacent tooth to a non-driving surface of the second adjacent tooth in the driving rotational direction when viewed in the axial direction. The circumferential area is equal to or smaller than 180 degrees. The large-sprocket downshifting tooth is disposed in the circumferential area when viewed in the axial direction.

With the bicycle sprocket assembly according to the eleventh aspect, it is possible to smoothen a multiple downshifting.

In accordance with a twelfth aspect of the present invention, the bicycle sprocket assembly according to the eleventh aspect is configured so that the first sprocket teeth include at least one first tooth and at least one second tooth. The at least one first tooth has a first maximum axial width defined in an axial direction parallel to the rotational center axis. The at least one second tooth has a second maximum axial width defined in the axial direction.

The first maximum axial width is larger than the second maximum axial width.

With the bicycle sprocket assembly according to the twelfth aspect, it is possible to improve a chain-holding performance of the bicycle sprocket assembly with smoothening the multiple downshifting.

In accordance with a thirteenth aspect of the present invention, a bicycle sprocket assembly comprises a first sprocket. The first sprocket includes a first sprocket body and first sprocket teeth. The first sprocket teeth extend radially outwardly from an outer periphery of the first sprocket body. A total number of the first sprocket teeth is equal to or larger than 14. The first sprocket teeth include a reference tooth and a downshifting tooth to facilitate a downshifting operation in which a bicycle chain is shifted from a second sprocket to the first sprocket. The second sprocket is adjacent to the first sprocket without another sprocket between the first sprocket and the second sprocket in an axial direction parallel to a rotational center axis of the bicycle sprocket assembly. The reference tooth has a reference circumferential width defined in a circumferential direction with respect to the rotational center axis. The downshifting tooth has a circumferential width defined in the circumferential direction. The reference circumferential width and the circumferential width are defined on a first pitch circle of the first sprocket. The circumferential width is larger than the reference circumferential width.

With the bicycle sprocket assembly according to the thirteenth aspect, it is possible to smoothen a multiple downshifting.

In accordance with a fourteenth aspect of the present invention, the bicycle sprocket assembly according to the thirteenth aspect is configured so that the circumferential width is equal to or larger than 3.6 mm.

With the bicycle sprocket assembly according to the fourteenth aspect, it is effectively possible to smoothen the multiple downshifting.

In accordance with a fifteenth aspect of the present invention, the bicycle sprocket assembly according to the thirteenth or fourteenth aspect is configured so that the first sprocket teeth include an additional downshifting tooth to facilitate a downshifting operation in which a bicycle chain is shifted from a second sprocket to the first sprocket. The additional downshifting tooth is adjacent to the downshifting tooth without another tooth between the downshifting tooth and the additional downshifting tooth. The additional downshifting tooth is disposed on an upstream side of the downshifting tooth in a driving rotational direction in which the bicycle sprocket assembly is rotated about a rotational center axis during pedaling.

With the bicycle sprocket assembly according to the fifteenth aspect, it is effectively possible to smoothen the multiple downshifting.

In accordance with a sixteenth aspect of the present invention, a bicycle drive train comprises the bicycle sprocket assembly according to any one of the first to fifteenth aspects attached to a bicycle rear hub assembly, a bicycle front sprocket, and the bicycle chain. The bicycle chain is engaged with the bicycle front sprocket and the bicycle sprocket assembly to transmit a driving rotational force between the bicycle front sprocket and the bicycle sprocket assembly.

With the bicycle drive train according to the sixteenth aspect, it is possible to smoothen a multiple downshifting.

In accordance with a seventeenth aspect of the present invention, the bicycle drive train according to the sixteenth aspect is configured so that the bicycle front sprocket comprised a solitary bicycle front sprocket.

With the bicycle drive train according to the seventeenth aspect, it is possible to effectively smoothen the multiple downshifting.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 13 is a table showing relationship between speed sprockets, a total number of teeth, and the first to third sprockets.

FIG. 19 is a table showing relationship between speed sprockets, a total number of teeth, and the first to third sprockets.

DESCRIPTION OF THE EMBODIMENTS

Figure 1:
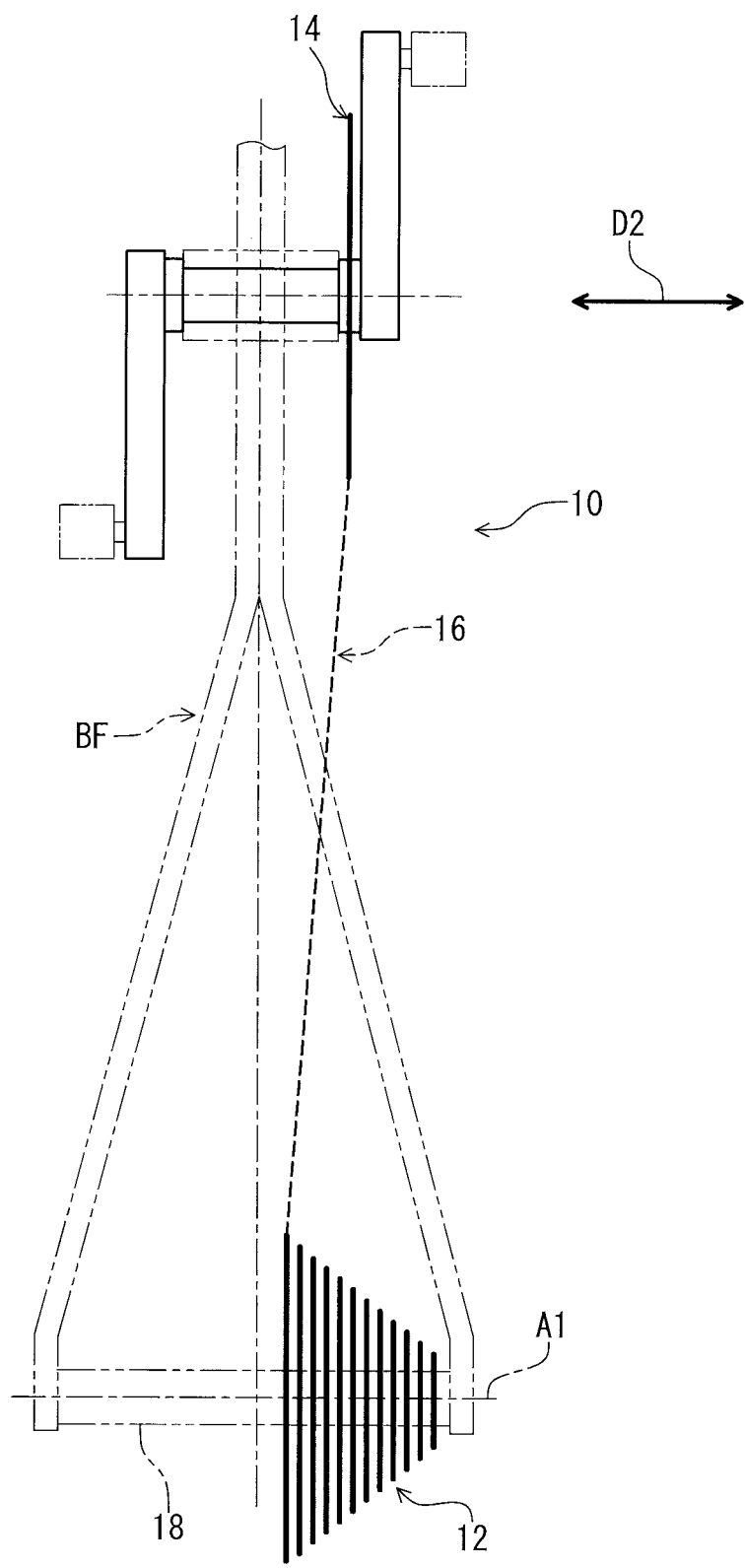
FIG. 1 is a schematic diagram of a bicycle drive train including a bicycle sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle drive train 10 in accordance with a first embodiment comprises a bicycle sprocket assembly 12, a bicycle front sprocket 14, and a bicycle chain 16. The bicycle sprocket assembly 12 is attached to a bicycle rear hub assembly 18. The bicycle rear hub assembly 18 is mounted to a bicycle frame BF. The bicycle sprocket assembly 12 has a rotational center axis A1 and is rotatably supported by the bicycle rear hub assembly 18 relative to the bicycle frame BF about the rotational center axis Al. The bicycle chain 16 is engaged with the bicycle front sprocket 14 and the bicycle sprocket assembly 12 to transmit a driving rotational force F1 between the bicycle front sprocket 14 and the bicycle sprocket assembly 12. The bicycle front sprocket 14 comprised a solitary bicycle front sprocket. In this embodiment, the bicycle sprocket assembly 12 is a bicycle rear sprocket assembly. However, the structure of the bicycle sprocket assembly 12 can be applied to a front sprocket assembly in a case where the front sprocket assembly includes at least two front sprockets. A total number of the bicycle front sprocket 14 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 12, should be interpreted relative to the bicycle equipped with the bicycle sprocket assembly 12 as used in an upright riding position on a horizontal surface.

Figure 2:
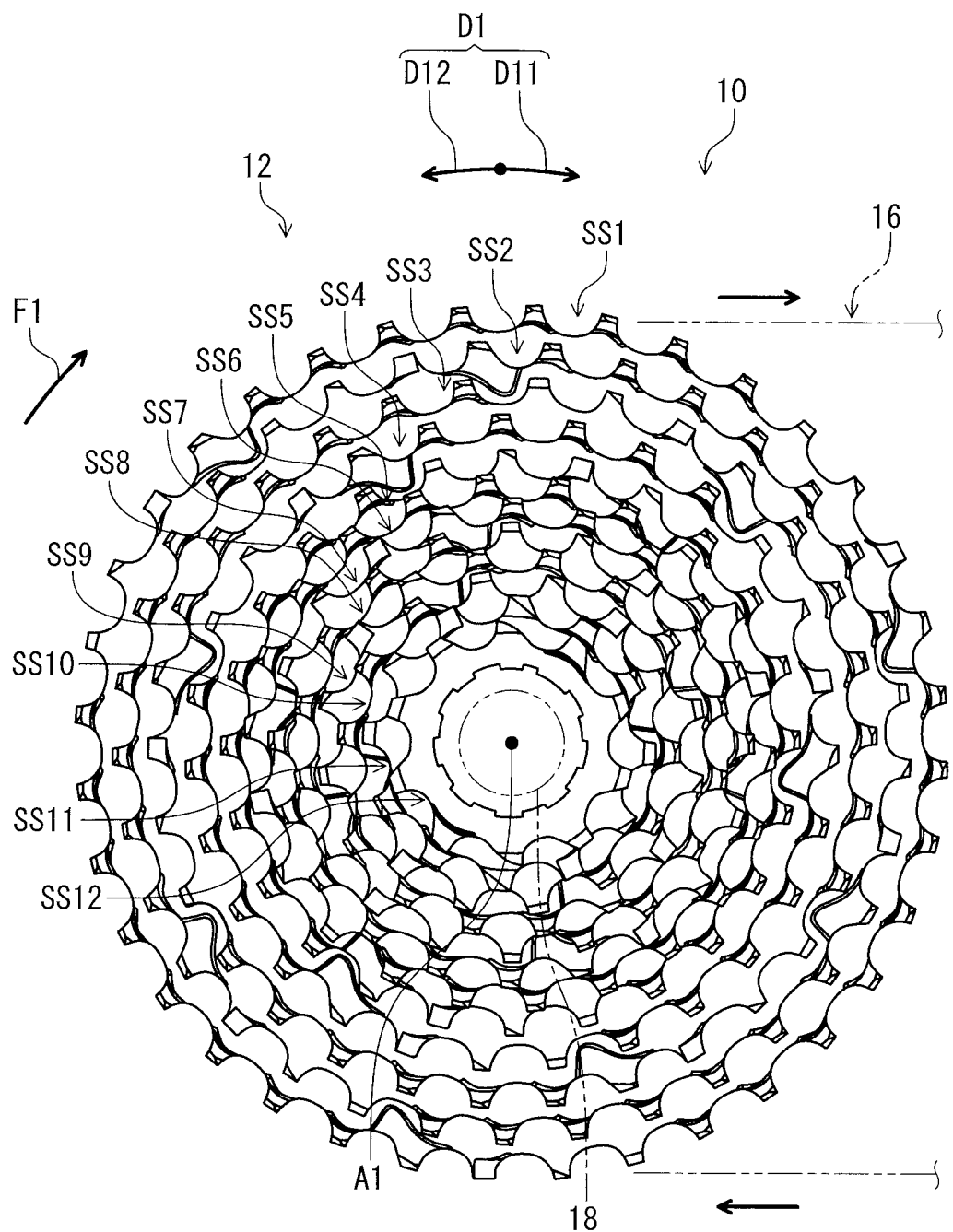
FIG. 2 is a side elevational view of the bicycle sprocket assembly of the bicycle drive train illustrated in FIG. 1.

As seen in FIG. 2, the bicycle sprocket assembly 12 is engaged with the bicycle chain 16 to transmit the driving rotational force F1 between the bicycle sprocket assembly 12 and the bicycle front sprocket 14 (FIG. 1). The bicycle sprocket assembly 12 is rotatable about the rotational center axis A1 in a driving rotational direction D11 during pedaling. A reverse rotational direction D12 is opposite to the driving rotational direction D11. The driving rotational direction D11 and the reverse rotational direction D12 are defined along a circumferential direction D1 of the bicycle sprocket assembly 12. The circumferential direction D1 is defined about the rotational center axis A1 of the bicycle sprocket assembly 12.

The bicycle sprocket assembly 12 comprises first to twelfth speed sprockets SS1 to SS12. Each of the first to twelfth speed sprockets SS1 to SS12 is engageable with the bicycle chain 16. The first to twelfth speed sprockets SS1 to SS12 respectively have first to twelfth speed stages of the bicycle drive train 10. The first speed sprocket SS1 corresponds to the first speed stage (i.e., low gear) of the bicycle sprocket assembly 12 and has a largest pitch-circle diameter among the first to twelfth speed sprockets SS1 to SS12. The twelfth speed sprocket SS12 corresponds to the twelfth speed stage (i.e., top gear) of the bicycle sprocket assembly 12 and has a smallest pitch-circle diameter among the first to twelfth speed sprockets SS1 to SS12. A total number of speed sprockets of the bicycle sprocket assembly 12 is not limited to this embodiment.

Figure 3:
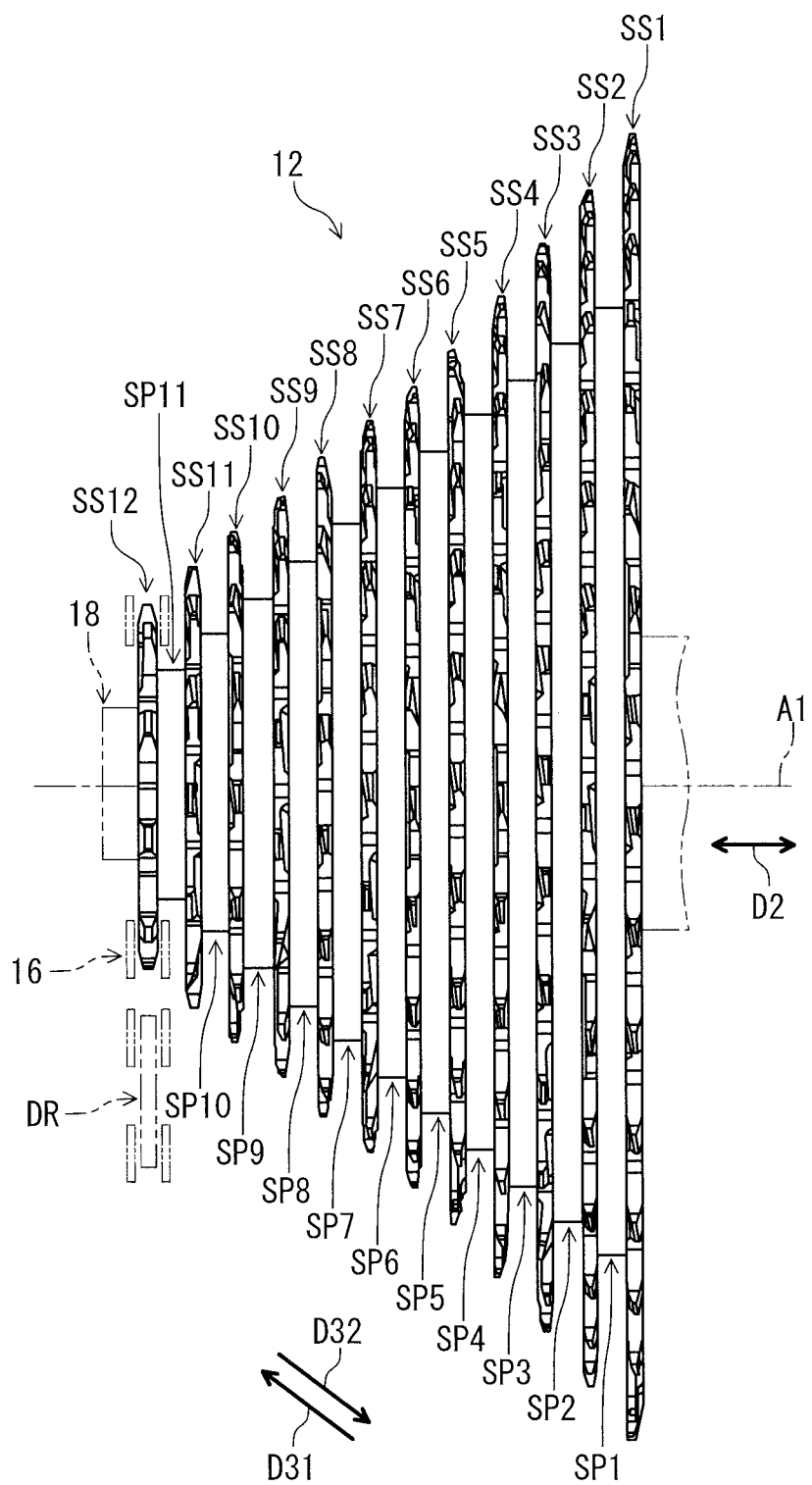
FIG. 3 is a front view of the bicycle sprocket assembly illustrated in FIG. 1.

As seen in FIG. 3, the bicycle sprocket assembly 12 further comprises first to eleventh spacers SP1 to SP11. The first spacer SP1 is provided between the first speed sprocket SS1 and the second speed sprocket SS2 in the axial direction D2. The second spacer SP2 is provided between the second speed sprocket SS2 and the third speed sprocket SS3 in the axial direction D2. The third spacer SP3 is provided between the third speed sprocket SS3 and the fourth speed sprocket SS4 in the axial direction D2. The fourth spacer SP4 is provided between the fourth speed sprocket SS4 and the fifth speed sprocket SS5 in the axial direction D2. The fifth spacer SP5 is provided between the fifth speed sprocket SS5 and the sixth speed sprocket SS6 in the axial direction D2. The sixth spacer SP6 is provided between the sixth speed sprocket SS6 and the seventh speed sprocket SS7 in the axial direction D2. The seventh spacer SP7 is provided between the seventh speed sprocket SS7 and the eighth speed sprocket SS8 in the axial direction D2. The eighth spacer SP8 is provided between the eighth speed sprocket SS8 and the ninth speed sprocket SS9 in the axial direction D2. The ninth spacer SP9 is provided between the ninth speed sprocket SS9 and the tenth speed sprocket SS10 in the axial direction D2. The tenth spacer SP10 is provided between the tenth speed sprocket SS10 and the eleventh speed sprocket SS11 in the axial direction D2. The eleventh spacer SP11 is provided between the eleventh speed sprocket SS11 and the twelfth speed sprocket SS12 in the axial direction D2.

In the bicycle sprocket assembly 12, an upshift occurs when the bicycle chain 16 is moved from a large sprocket to the next small sprocket by a derailleur DR in an upshifting direction D31. In the bicycle sprocket assembly 12, a downshift occurs when the bicycle chain 16 is moved from a small sprocket to the next large sprocket in a downshifting direction D32.

As seen in FIG. 13, the neighboring three speed sprockets can correspond to first to third sprockets. The tooth-number difference TND1 can be equal to two or three in this embodiment. Options OP1 to OP6 correspond to the tooth-number difference TND1 which is equal to two. Options OP7 to OP10 correspond to the tooth-number difference TND1 which is equal to three. In the following, the tenth to twelfth speed sprockets SS10 to SS12 will be described in detail below regarding the option OP1. In the option OP1, the tenth speed sprocket SS10, the eleventh speed sprocket SS11, and the twelfth speed sprocket SS12 correspond to a first sprocket, a second sprocket, and a third sprocket, respectively. Namely, the bicycle sprocket assembly 12 comprises the first sprocket, the second sprocket, and the third sprocket.

As seen in FIG. 3, the eleventh speed sprocket SS11 is adjacent to the tenth speed sprocket SS10 without another sprocket between the tenth speed sprocket SS10 and the eleventh speed sprocket SS11 in the axial direction D2 parallel to a rotational center axis A1 of the bicycle sprocket assembly 12. The twelfth speed sprocket SS12 is adjacent to the eleventh speed sprocket SS11 without another sprocket between the eleventh speed sprocket SS11 and the twelfth speed sprocket SS12 in the axial direction D2.

Figure 4:
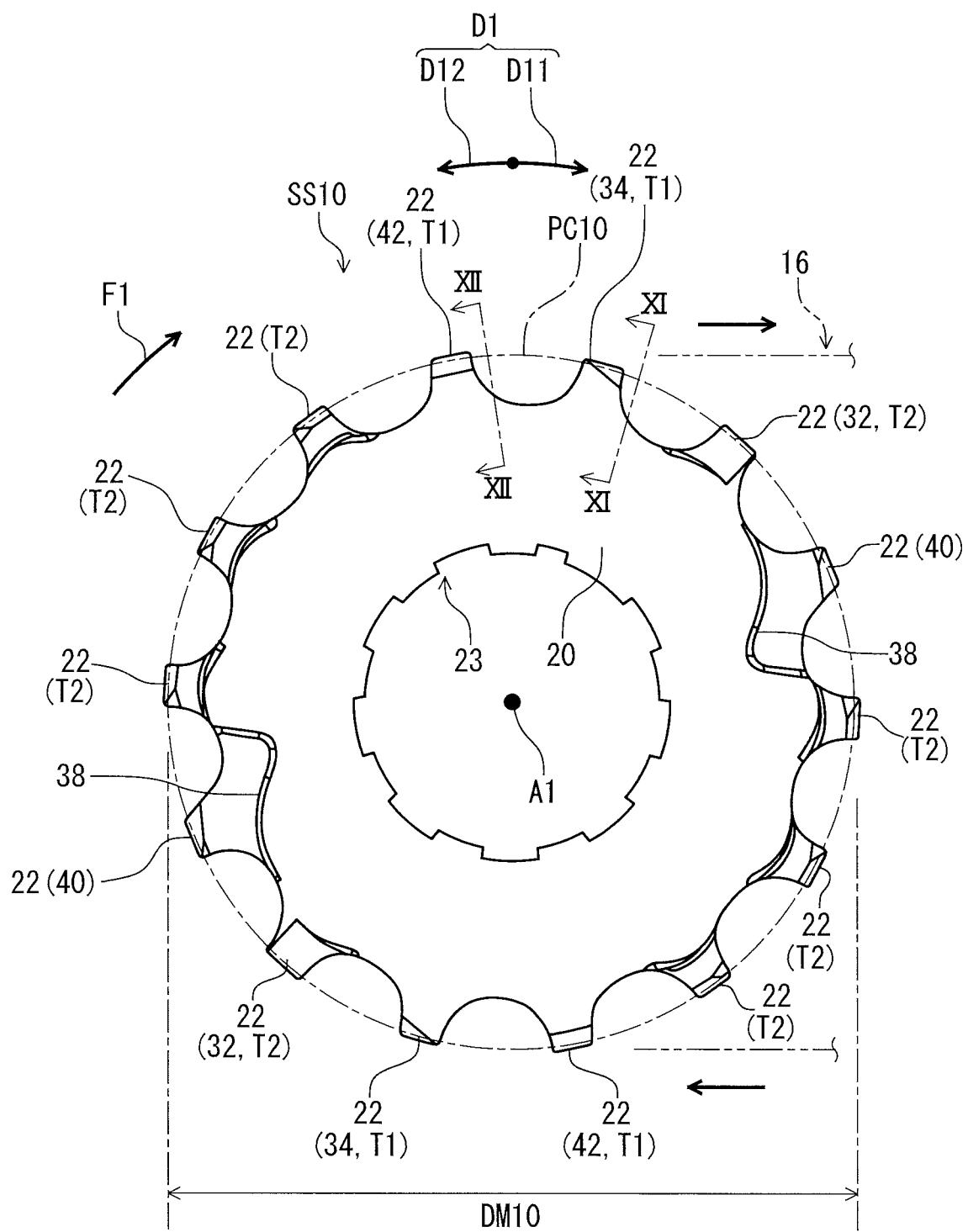
FIG. 4 is a side elevational view of a first sprocket of the bicycle sprocket assembly illustrated in FIG. 1 (option OP1).

As seen in FIG. 4, the tenth speed sprocket SS10 includes a tenth sprocket body 20 and a plurality of tenth sprocket teeth 22. In the option OP1, the tenth sprocket body 20 and the plurality of tenth sprocket teeth 22 correspond to a first sprocket body and a plurality of first sprocket teeth, respectively. The tenth sprocket teeth 22 extend radially outwardly from an outer periphery of the tenth sprocket body 20. The tenth speed sprocket SS10 includes a tenth pitch circle PC10 having a tenth diameter DM10. In the option OP1, the tenth pitch circle PC10 and the tenth diameter DM10 correspond to a first pitch circle and a first diameter, respectively. The tenth pitch circle PC10 is defined by the tenth sprocket teeth 22. Specifically, the tenth pitch circle PC10 is defined by centers of pins of the bicycle chain 16 engaged with the tenth speed sprocket SS10. The tenth speed sprocket SS10 includes a tenth hub engagement part 23 provided on an inner periphery of the tenth sprocket body 20 to engage with the bicycle rear hub assembly 18 (FIG. 3).

A total number of the tenth sprocket teeth 22 is equal to or less than 24. The total number of the tenth sprocket teeth 22 is equal to or larger than 14. In this embodiment, the total number of the tenth sprocket teeth 22 is equal to 14. However, the total number of the tenth sprocket teeth 22 is not limited to this embodiment.

Figure 5:
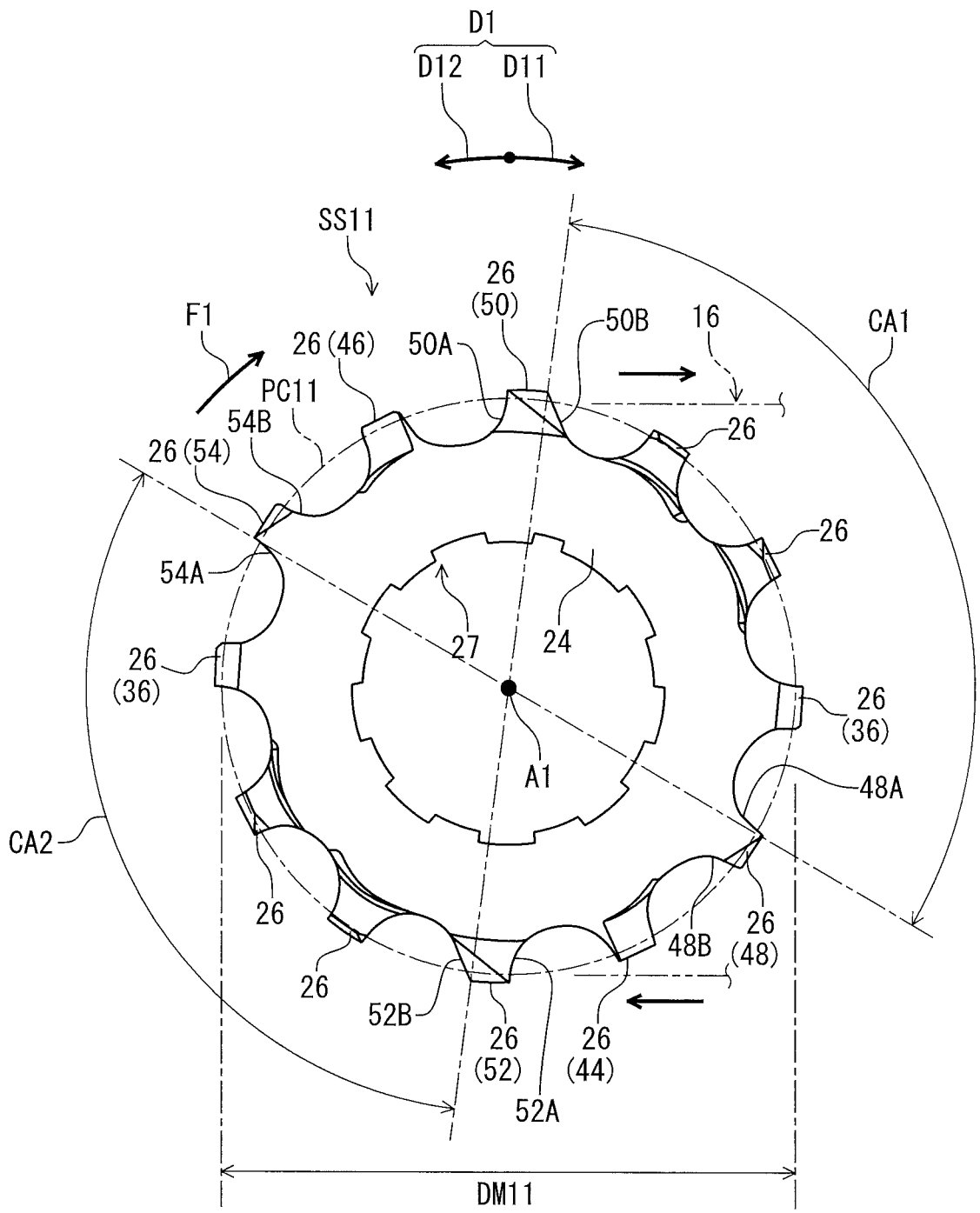
FIG. 5 is a side elevational view of a second sprocket of the bicycle sprocket assembly illustrated in FIG. 1 (option OP1).

As seen in FIG. 5, the eleventh speed sprocket SS11 includes an eleventh sprocket body 24 and a plurality of eleventh sprocket teeth 26. In the option OP1, the eleventh sprocket body 24 and the plurality of eleventh sprocket teeth 26 correspond to a second sprocket body and a plurality of second sprocket teeth, respectively. The eleventh sprocket teeth 26 extend radially outwardly from an outer periphery of the eleventh sprocket body 24. The eleventh speed sprocket SS11 includes an eleventh pitch circle PC11 having an eleventh diameter DM11. In the option OP1, the eleventh pitch circle PC11 and the eleventh diameter DM11 correspond to a second pitch circle and a second diameter, respectively. The eleventh pitch circle PC11 is defined by the eleventh sprocket teeth 26. Specifically, the eleventh pitch circle PC11 is defined by centers of pins of the bicycle chain 16 engaged with the eleventh speed sprocket SS11. The eleventh speed sprocket SS11 includes a second hub engagement part 27 provided on an inner periphery of the eleventh sprocket body 24 to engage with the bicycle rear hub assembly 18 (FIG. 3). In this embodiment, a total number of the eleventh sprocket teeth 26 is 12. However, the total number of the eleventh sprocket teeth 26 is not limited to this embodiment.

Figure 6:
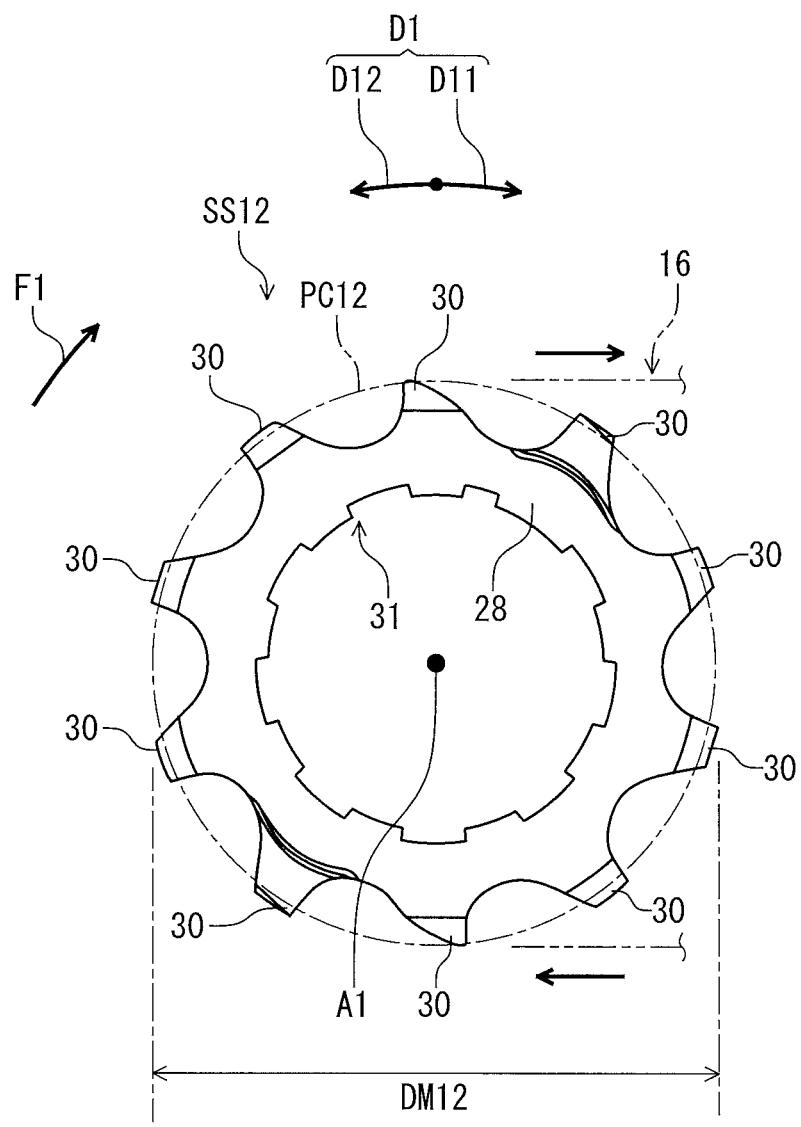
FIG. 6 is a side elevational view of a third sprocket of the bicycle sprocket assembly illustrated in FIG. 1 (option OP1).

As seen in FIG. 6, the twelfth speed sprocket SS12 comprises a twelfth sprocket body 28 and a plurality of twelfth sprocket teeth 30. In the option OP1, the twelfth sprocket body 28 and the plurality of twelfth sprocket teeth 30 correspond to a third sprocket body and a plurality of third sprocket teeth, respectively. The twelfth sprocket teeth 30 extend radially outwardly from an outer periphery of the twelfth sprocket body 28. The twelfth speed sprocket SS12 includes a twelfth pitch circle PC12 having a twelfth diameter DM12. In the option OP1, the twelfth pitch circle PC12 and the twelfth diameter DM12 correspond to a third pitch circle and a third diameter. The twelfth pitch circle PC12 is defined by the twelfth sprocket teeth 30. Specifically, the twelfth pitch circle PC12 is defined by centers of pins of the bicycle chain 16 engaged with the twelfth speed sprocket SS12. In this embodiment, the total number of the twelfth sprocket teeth 30 is equal to or smaller than 10. The total number of the twelfth sprocket teeth 30 is equal to 10. However, the total number of the twelfth sprocket teeth 30 is not limited to this embodiment.

Figure 7:
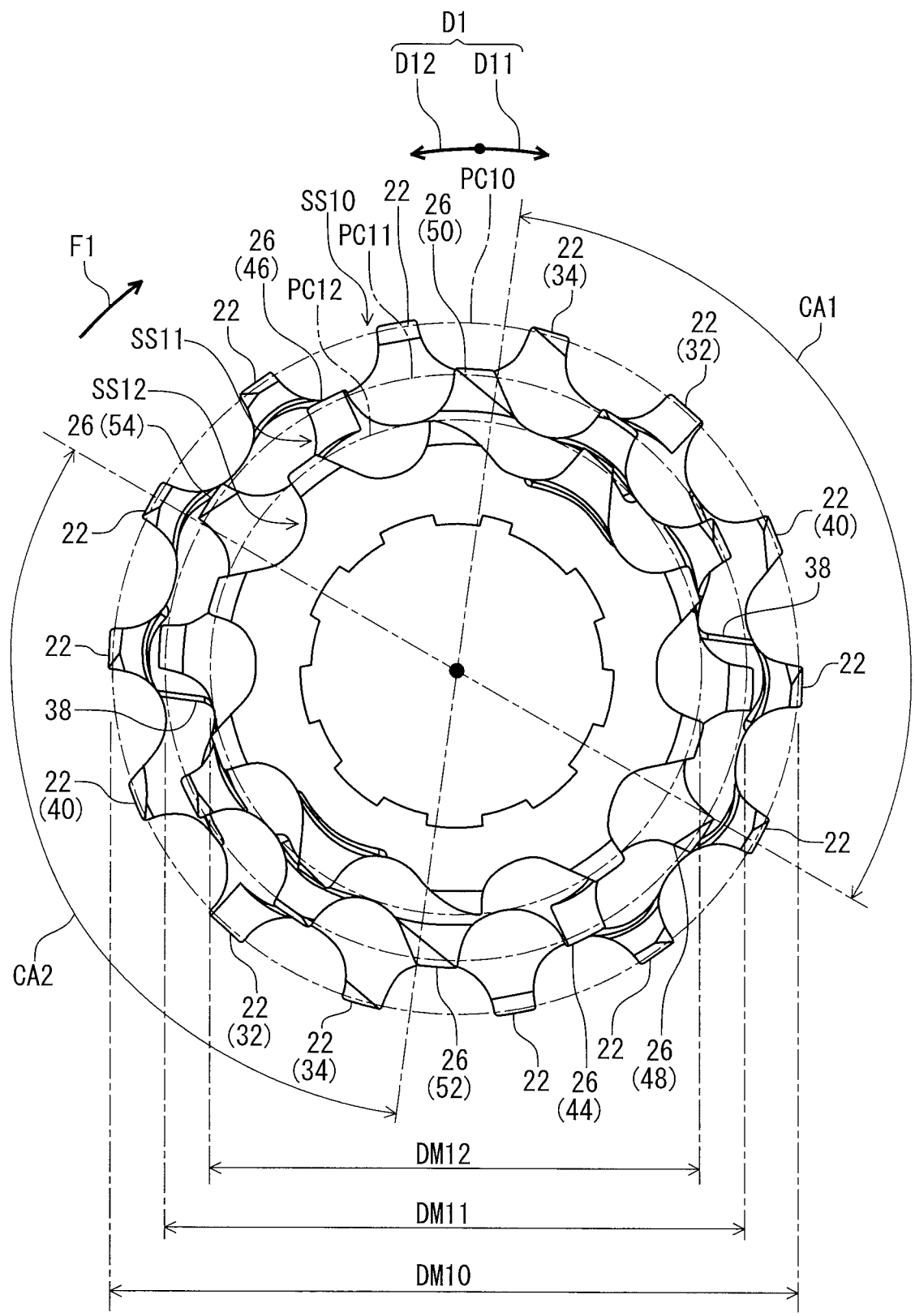
FIG. 7 is a side elevational view of the first to third sprockets of the bicycle sprocket assembly illustrated in FIG. 1 (option OP1).

As seen in FIG. 7, the total number of the eleventh sprocket teeth 26 is smaller than the total number of the tenth sprocket teeth 22 by a tooth-number difference TND1 (FIG. 13) that is equal to or less than five. In this embodiment, the tooth-number difference TND1 is equal to two since the total number of the tenth sprocket teeth 22 is 14 and the total number of the eleventh sprocket teeth 26 is 12. However, the tooth-number difference TND1 is not limited to this embodiment.

The total number of the twelfth sprocket teeth 30 is smaller than the total number of the tenth sprocket teeth 22 by the tooth-number difference TND1 that is equal to or less than five. In this embodiment, the tooth-number difference TND1 is equal to two since the total number of the eleventh sprocket teeth 26 is 12 and the total number of the twelfth sprocket teeth 30 is 10. However, the tooth-number difference TND1 is not limited to this embodiment. The bicycle sprocket assembly 12 comprises a smallest sprocket having a minimum total number of sprocket teeth which is equal to or smaller than 10. In this embodiment, the twelfth speed sprocket SS12 is the smallest sprocket.

As seen in FIG. 7, the eleventh diameter DM11 is smaller than the tenth diameter DM10. The twelfth diameter DM12 is smaller than the tenth diameter DM10 and the eleventh diameter DM11.

Figure 8:
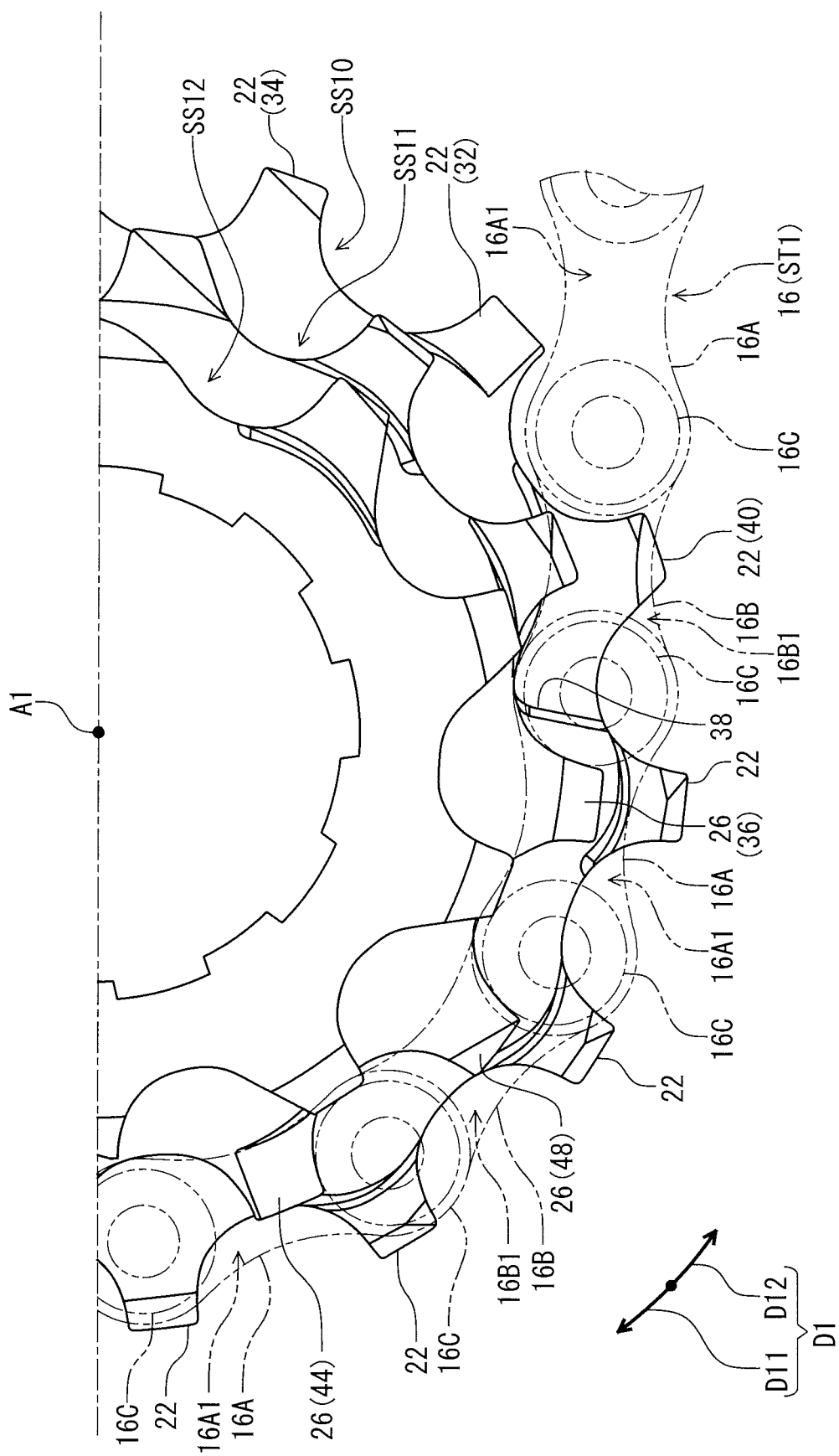
FIG. 8 is a partial side elevational view of the first to third sprockets of the bicycle sprocket assembly illustrated in FIG. 1, with a bicycle chain (first chain phase state) (option OP1).
Figure 9:
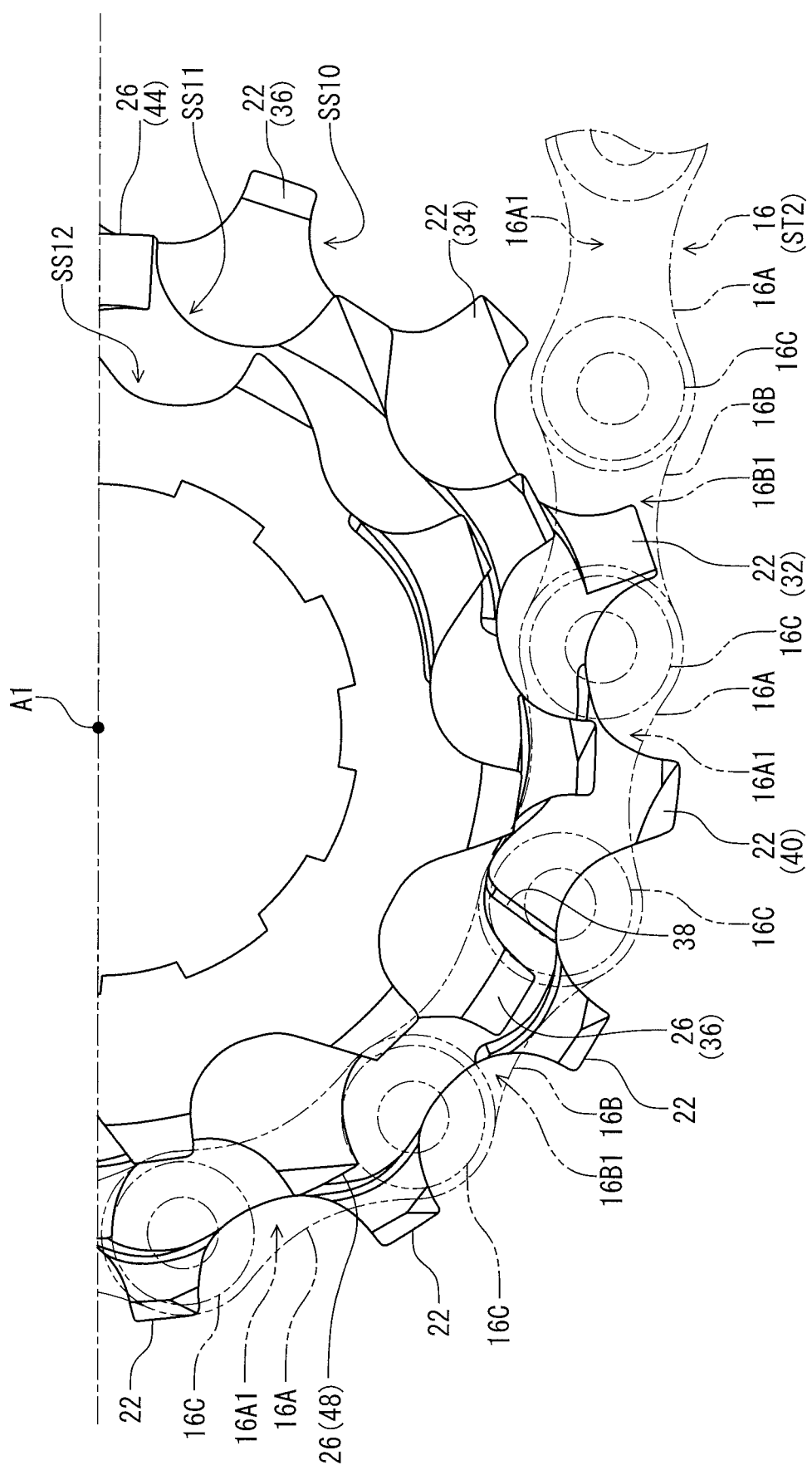
FIG. 9 is another partial side elevational view of the first to third sprockets of the bicycle sprocket assembly illustrated in FIG. 1, with a bicycle chain (second chain phase state) (option OP1).

As seen in FIG. 8, the tenth sprocket teeth 22 include a large-sprocket downshifting tooth 32 to first receive the bicycle chain 16 from the eleventh speed sprocket SS11 in a first chain phase state ST1 in which the bicycle chain 16 is shifted from the eleventh speed sprocket SS11 to the tenth speed sprocket SS10. As seen in FIG. 9, the tenth sprocket teeth 22 include an additional large-sprocket downshifting tooth 34 to first receive the bicycle chain 16 from the eleventh speed sprocket SS11 in a second chain phase state ST2 in which the bicycle chain 16 is shifted from the eleventh speed sprocket SS11 to the tenth speed sprocket SS10. As seen in FIGS. 8 and 9, the second chain phase state ST2 is different from the first chain phase state ST1.

In this embodiment, as seen in FIGS. 8 and 9, each of the first chain phase state ST1 and the second chain phase state ST2 is defined a positional relationship between opposed pairs of outer link plates 16A, opposed pairs of inner link plates 16B, and the eleventh sprocket teeth 26. The eleventh sprocket teeth 26 includes a chain-phase reference tooth 36 to define the first chain phase state ST1 and the second chain phase state ST2. As seen in FIG. 8, the chain-phase reference tooth 36 is provided in an outer link space 16A1 defined between the opposed pair of outer link plates 16A in the first chain phase state ST1. The chain-phase reference tooth 36 is provided in an inner link space 16B1 defined between the opposed pair of inner link plates 16B in the second chain phase state ST2. Namely, a circumferential positional relationship between the opposed pairs of outer link plates 16A, the opposed pairs of inner link plates 16B, and the eleventh sprocket teeth 26 in the second chain phase state ST2 is different from a circumferential positional relationship between the opposed pairs of outer link plates 16A, the opposed pairs of inner link plates 16B, and the eleventh sprocket teeth 26 in the first chain phase state ST1.

In this embodiment, the large-sprocket downshifting tooth 32 can also be referred to as a downshifting tooth 32. The additional large-sprocket downshifting tooth 34 can also be referred to as an additional downshifting tooth 34. Namely, the tenth sprocket teeth 22 include the downshifting tooth 32 to facilitate a downshifting operation in which the bicycle chain 16 is shifted from the eleventh speed sprocket SS11 to the tenth speed sprocket SS10. The tenth sprocket teeth 22 include the additional downshifting tooth 34 to facilitate a downshifting operation in which the bicycle chain 16 is shifted from the eleventh speed sprocket SS11 to the tenth speed sprocket SS10.

As seen in FIG. 8, the additional large-sprocket downshifting tooth (the additional downshifting tooth) 34 is adjacent to the large-sprocket downshifting tooth (the downshifting tooth) 32 without another tooth between the large-sprocket downshifting tooth 32 and the additional large-sprocket downshifting tooth 34. The additional large-sprocket downshifting tooth (the additional downshifting tooth) 34 is disposed on an upstream side of the large-sprocket downshifting tooth (the downshifting tooth) 32 in the driving rotational direction D11 in which the bicycle sprocket assembly 12 is rotated about the rotational center axis A1 during pedaling.

As seen in FIGS. 4, 8, and 9, the tenth speed sprocket SS10 includes a downshifting facilitation recess 38 to facilitate a shifting operation in the first chain phase state and a shifting operation in the second chain phase state. The downshifting facilitation recess 38 reduces interference between the tenth speed sprocket SS10 and the bicycle chain 16 in the first chain phase state and the second chain phase state. The downshifting facilitation recess 38 is adjacent to the large-sprocket downshifting tooth 32 without another tooth between the downshifting facilitation recess 38 and the large-sprocket downshifting tooth 32 in the driving rotational direction D11. The downshifting facilitation recess 38 is provided on a downstream side of the large-sprocket downshifting tooth 32 in the driving rotational direction D11.

The tenth sprocket teeth 22 include a downshifting facilitation tooth 40 provided in the downshifting facilitation recess 38. The downshifting facilitation tooth 40 is adjacent to the large-sprocket downshifting tooth 32 without another tooth between the downshifting facilitation tooth 40 and the large-sprocket downshifting tooth 32 in the driving rotational direction D11. The downshifting facilitation tooth 40 is provided on a downstream side of the large-sprocket downshifting tooth 32 in the driving rotational direction D11.

In this embodiment, as seen in FIG. 4, the tenth sprocket teeth 22 include a plurality of large-sprocket downshifting teeth 32, a plurality of additional large-sprocket downshifting teeth 34, and a plurality of downshifting facilitation teeth 40. The tenth speed sprocket SS10 includes a plurality of downshifting facilitation recesses 38. However, the tenth sprocket teeth 22 can include only one large-sprocket downshifting tooth 32 or at least three large-sprocket downshifting teeth 32. The tenth sprocket teeth 22 can include only one additional large-sprocket downshifting tooth 34 or at least three additional large-sprocket downshifting teeth 34. The tenth sprocket teeth 22 can include only one downshifting facilitation tooth 40 or at least three downshifting facilitation teeth 40. The tenth speed sprocket SS10 can include only one downshifting facilitation recess 38 or at least three downshifting facilitation recesses 38.

As seen in FIG. 4, the tenth sprocket teeth 22 include a reference tooth 42. In this embodiment, the reference tooth 42 is adjacent to the additional large-sprocket downshifting tooth 34 without another tooth between the reference tooth 42 and the additional large-sprocket downshifting tooth 34 in the circumferential direction D1. The reference tooth 42 is provided on an upstream side of the additional large-sprocket downshifting tooth 34 in the driving rotational direction D11. The tenth sprocket teeth 22 include a plurality of reference teeth 42. However, a total number of the reference tooth 42 is not limited to this embodiment.

Figure 10:
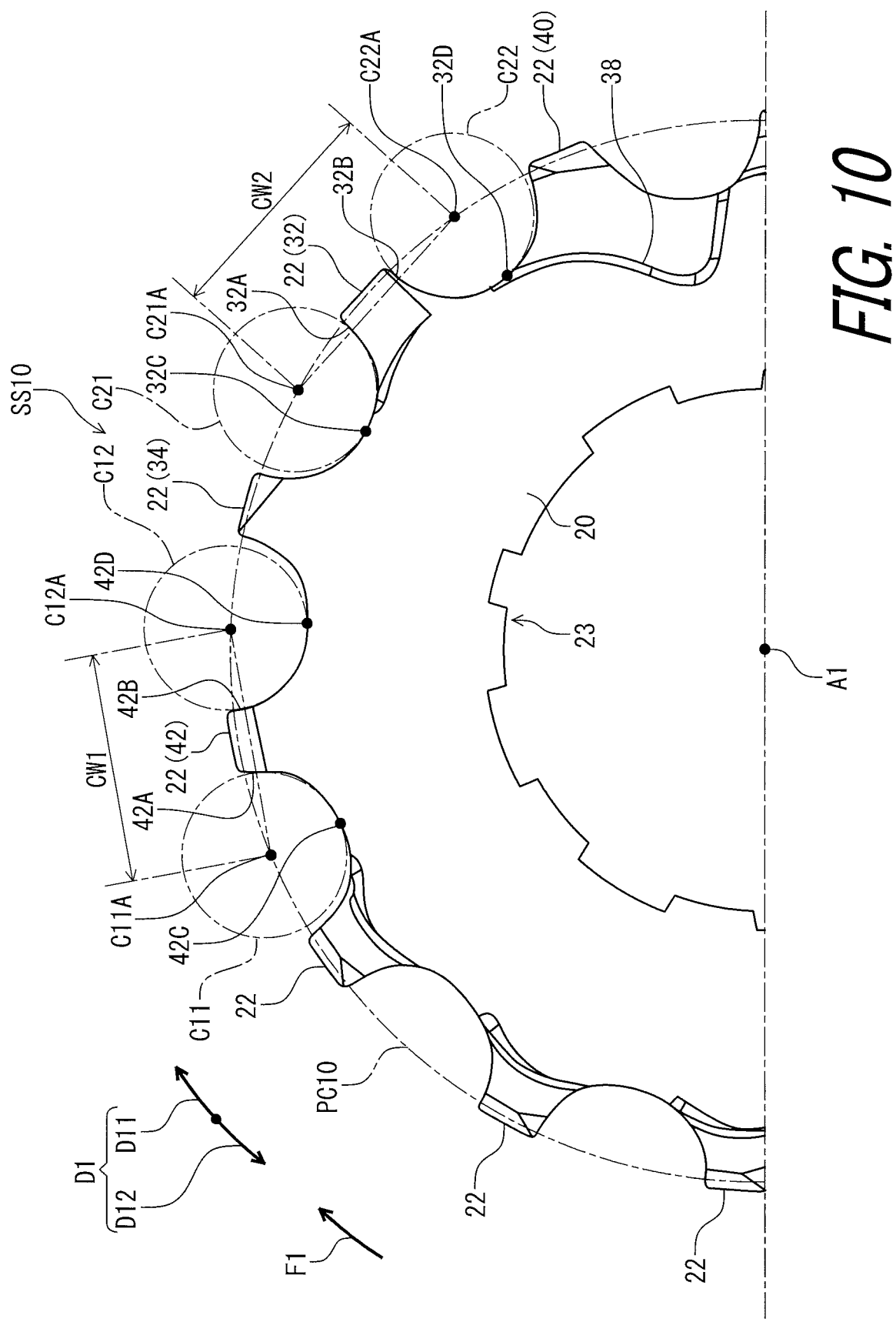
FIG. 10 is a partial side elevational view of the first sprocket of the bicycle sprocket assembly illustrated in FIG. 1 (option OP1).

As seen in FIG. 10, the reference tooth 42 has a reference circumferential width CW1 defined in the circumferential direction D1 with respect to the rotational center axis A1. The downshifting tooth 32 has a circumferential width CW2 defined in the circumferential direction D1. The reference circumferential width CW1 and the circumferential width CW2 are defined on the tenth pitch circle PC10 of the tenth speed sprocket SS10.

In this embodiment, the reference tooth 42 includes a driving surface 42A and a non-driving surface 42B. The driving surface 42A is configured to be in contact with a roller 16C (FIG. 8) of the bicycle chain 16 to transmit the driving rotational force F1 between the bicycle chain 16 and the tenth speed sprocket SS10 during pedaling. The non-driving surface 42B is provided on a reverse side of the driving surface 42A in the circumferential direction D1. The non-driving surface 42B is disposed on a downstream side of the driving surface 42A in the driving rotational direction D11. The reference tooth 42 includes an upstream tooth bottom 42C and a downstream tooth bottom 42D.

An upstream inscribed circle C11 is defined by the driving surface 42A and the upstream tooth bottom 42C. A downstream inscribed circle C12 is defined by the non-driving surface 42B and the downstream tooth bottom 42D. A center C11A of the upstream inscribed circle C11 is defined on the tenth pitch circle PC10 of the tenth speed sprocket SS10. A center C12A of the downstream inscribed circle C12 is defined on the tenth pitch circle PC10 of the tenth speed sprocket SS10. The reference circumferential width CW1 is defined between the center C11A of the upstream inscribed circle C11 and the center C12A of the downstream inscribed circle C12.

Similarly, as seen in FIG. 10, the downshifting tooth 32 includes a driving surface 32A and a non-driving surface 32B. The driving surface 32A is configured to be in contact with the roller 16C (FIG. 8) of the bicycle chain 16 to transmit the driving rotational force F1 between the bicycle chain 16 and the tenth speed sprocket SS10 during pedaling. The non-driving surface 32B is provided on a reverse side of the driving surface 32A in the circumferential direction D1. The non-driving surface 32B is disposed on a downstream side of the driving surface 32A in the driving rotational direction D11. The downshifting tooth 32 includes an upstream tooth bottom 32C and a downstream tooth bottom 32D.

An upstream inscribed circle C21 is defined by the driving surface 32A and the upstream tooth bottom 32C. A downstream inscribed circle C22 is defined by the non-driving surface 32B and the downstream tooth bottom 32D. A center C21A of the upstream inscribed circle C21 is defined on the tenth pitch circle PC10 of the tenth speed sprocket SS10. A center C22A of the downstream inscribed circle C22 is defined on the tenth pitch circle PC10 of the tenth speed sprocket SS10. The circumferential width CW2 is defined between the center C21A of the upstream inscribed circle C21 and the center C22A of the downstream inscribed circle C22.

As seen in FIG. 10, the circumferential width CW2 is larger than the reference circumferential width CW1. The circumferential width CW2 is equal to or larger than 3.6 mm. The circumferential width CW2 is equal to or smaller than 3.8 mm. In this embodiment, the circumferential width CW2 is equal to 3.68 mm, and the reference circumferential width CW1 is equal to 3.42 mm. However, the reference circumferential width CW1 and the circumferential width CW2 are not limited to this embodiment. For example, if the total number of the tenth sprocket teeth 22 gets larger from 15, the reference circumferential width CW1 gets smaller while the circumferential width CW2 is substantially constant in each sprocket.

As seen in FIG. 5, the eleventh sprocket teeth 26 include a first small-sprocket downshifting tooth 44 to facilitate a downshifting operation in which the bicycle chain 16 is shifted from the twelfth speed sprocket SS12 to the eleventh speed sprocket SS11. The eleventh sprocket teeth 26 include a second small-sprocket downshifting tooth 46 to facilitate a downshifting operation in which the bicycle chain 16 is shifted from the twelfth speed sprocket SS12 to the eleventh speed sprocket SS11. The second small-sprocket downshifting tooth 46 is spaced apart from the first small-sprocket downshifting tooth 44 in the circumferential direction D1.

In this embodiment, each of the first small-sprocket downshifting tooth 44 and the second small-sprocket downshifting tooth 46 is configured to first receive the bicycle chain 16 from the twelfth speed sprocket SS12 in the downshifting operation in which the bicycle chain 16 is shifted from the twelfth speed sprocket SS12 to the eleventh speed sprocket SS11. The first small-sprocket downshifting tooth 44 and the second small-sprocket downshifting tooth 46 have substantially the same structures as that of the large-sprocket downshifting teeth 32 of the tenth speed sprocket SS10. The second small-sprocket downshifting tooth 46 has the same structure as that of the first small-sprocket downshifting tooth 44. The second small-sprocket downshifting tooth 46 is disposed on an opposite side of the second small-sprocket downshifting tooth 46 with respect to the rotational center axis A1.

The eleventh sprocket teeth 26 include a first adjacent tooth 48 adjacent to the first small-sprocket downshifting tooth 44 without another tooth between the first small-sprocket downshifting tooth 44 and the first adjacent tooth 48 in the circumferential direction D1. The first adjacent tooth 48 is disposed on an upstream side of the first small-sprocket downshifting tooth 44 in the driving rotational direction D11.

In this embodiment, the first adjacent tooth 48 is configured to first receive the bicycle chain 16 from the twelfth speed sprocket SS12 in the downshifting operation in which the bicycle chain 16 is shifted from the twelfth speed sprocket SS12 to the eleventh speed sprocket SS11. The first adjacent tooth 48 have substantially the same structures as that of the additional large-sprocket downshifting teeth 34 of the tenth speed sprocket SS10.

The first adjacent tooth 48 includes a driving surface 48A and a non-driving surface 48B. The driving surface 48A is configured to be in contact with the roller 16C (FIG. 8) of the bicycle chain 16 to transmit the driving rotational force F1 between the bicycle chain 16 and the eleventh speed sprocket SS11 during pedaling. The non-driving surface 48B is provided on a reverse side of the driving surface 48A in the circumferential direction D1. The non-driving surface 48B is disposed on a downstream side of the driving surface 48A in the driving rotational direction D11.

The eleventh sprocket teeth 26 include a second adjacent tooth 50 adjacent to the second small-sprocket downshifting tooth 46 without another tooth between the second small-sprocket downshifting tooth 46 and the second adjacent tooth 50 in the circumferential direction D1. The second adjacent tooth 50 is disposed on a downstream side of the second small-sprocket downshifting tooth 46 in the driving rotational direction D11.

The second adjacent tooth 50 includes a driving surface 50A and a non-driving surface 50B. The driving surface 50A is configured to be in contact with the roller 16C (FIG. 8) of the bicycle chain 16 to transmit the driving rotational force F1 between the bicycle chain 16 and the eleventh speed sprocket SS11 during pedaling. The non-driving surface 50B is provided on a reverse side of the driving surface 50A in the circumferential direction D1. The non-driving surface 50B is disposed on a downstream side of the driving surface 50A in the driving rotational direction D11.

A circumferential area CA1 is defined from the driving surface 48A of the first adjacent tooth 48 to the non-driving surface 50B of the second adjacent tooth 50 in the driving rotational direction D11 about the rotational center axis A1 when viewed in the axial direction D2. The circumferential area CA1 has an angle equal to or smaller than 180 degrees about the rotational center axis A1.

As seen in FIG. 5, the eleventh sprocket teeth 26 include a third adjacent tooth 52 adjacent to the first small-sprocket downshifting tooth 44 without another tooth between the first small-sprocket downshifting tooth 44 and the third adjacent tooth 52 in the circumferential direction D1. The third adjacent tooth 52 is disposed on a downstream side of the first small-sprocket downshifting tooth 44 in the driving rotational direction D11.

The third adjacent tooth 52 includes a driving surface 52A and a non-driving surface 52B. The driving surface 52A is configured to be in contact with the roller 16C (FIG. 8) of the bicycle chain 16 to transmit the driving rotational force F1 between the bicycle chain 16 and the eleventh speed sprocket SS11 during pedaling. The non-driving surface 52B is provided on a reverse side of the driving surface 52A in the circumferential direction D1. The non-driving surface 52B is disposed on a downstream side of the driving surface 52A in the driving rotational direction D11.

The eleventh sprocket teeth 26 include a fourth adjacent tooth 54 adjacent to the second small-sprocket downshifting tooth 46 without another tooth between the second small-sprocket downshifting tooth 46 and the fourth adjacent tooth 54 in the circumferential direction D1. The fourth adjacent tooth 54 is disposed on an upstream side of the second small-sprocket downshifting tooth 46 in the driving rotational direction D11.

In this embodiment, the fourth adjacent tooth 54 is configured to first receive the bicycle chain 16 from the twelfth speed sprocket SS12 in the downshifting operation in which the bicycle chain 16 is shifted from the twelfth speed sprocket SS12 to the eleventh speed sprocket SS11. The fourth adjacent tooth 54 has substantially the same structures as that of the additional large-sprocket downshifting teeth 34 of the tenth speed sprocket SS10.

The fourth adjacent tooth 54 includes a driving surface 54A and a non-driving surface 54B. The driving surface 54A is configured to be in contact with the roller 16C (FIG. 8) of the bicycle chain 16 to transmit the driving rotational force F1 between the bicycle chain 16 and the eleventh speed sprocket SS11 during pedaling. The non-driving surface 54B is provided on a reverse side of the driving surface 54A in the circumferential direction D1. The non-driving surface 54B is disposed on a downstream side of the driving surface 54A in the driving rotational direction D11.

An additional circumferential area CA2 is defined from the non-driving surface 52B of the third adjacent tooth 52 to the driving surface 54A of the fourth adjacent tooth 54 in the driving rotational direction D11 about the rotational center axis A1 when viewed in the axial direction D2. The additional circumferential area CA2 has an angle equal to or smaller than 180 degrees about the rotational center axis A1.

As seen in FIG. 7, the large-sprocket downshifting tooth 32 is disposed in the circumferential area CA1 when viewed in the axial direction D2. One of the large-sprocket downshifting teeth 32 is disposed in the circumferential area CA1 when viewed in the axial direction D2. In this embodiment, the large-sprocket downshifting tooth 32 is entirely disposed in the circumferential area CA1 when viewed in the axial direction D2. However, the large-sprocket downshifting tooth 32 can be partly disposed in the circumferential area CA1 when viewed in the axial direction D2.

The additional large-sprocket downshifting tooth 34 is disposed in the circumferential area CA1 when viewed in the axial direction D2. One of the additional large-sprocket downshifting teeth 34 is disposed in the circumferential area CA1 when viewed in the axial direction D2. The additional large-sprocket downshifting tooth 34 is partly disposed in the circumferential area CA1 when viewed in the axial direction D2. However, the additional large-sprocket downshifting tooth 34 can be entirely disposed in the circumferential area CA1 when viewed in the axial direction D2. At least one of the large-sprocket downshifting tooth 32 and the additional large-sprocket downshifting tooth 34 can be disposed outside the circumferential area CA1 when viewed in the axial direction D2.

As seen in FIG. 7, the other of the large-sprocket downshifting teeth 32 is disposed in the additional circumferential area CA2 when viewed in the axial direction D2. In this embodiment, the other of the large-sprocket downshifting teeth 32 is entirely disposed in the additional circumferential area CA2 when viewed in the axial direction D2. However, the large-sprocket downshifting tooth 32 can be partly disposed in the additional circumferential area CA2 when viewed in the axial direction D2.

The other of the additional large-sprocket downshifting teeth 34 is disposed in the additional circumferential area CA2 when viewed in the axial direction D2. The other of the additional large-sprocket downshifting teeth 34 is partly disposed in the additional circumferential area CA2 when viewed in the axial direction D2. However, the additional large-sprocket downshifting tooth 34 can be entirely disposed in the additional circumferential area CA2 when viewed in the axial direction D2. At least one of the large-sprocket downshifting tooth 32 and the additional large-sprocket downshifting tooth 34 can be disposed outside the additional circumferential area CA2 when viewed in the axial direction D2.

As seen in FIG. 4, the tenth sprocket teeth 22 include at least one first tooth T1 and at least one second tooth T2. In this embodiment, the tenth sprocket teeth 22 include first teeth T1 and second teeth T2. The large-sprocket downshifting tooth 32 corresponds to the first tooth T1. The additional large-sprocket downshifting tooth 34 and the reference tooth 42 correspond to the second tooth T2. In this embodiment, the large-sprocket downshifting tooth 32 and the additional large-sprocket downshifting tooth 34 will be described below as examples of the first tooth T1 and the second tooth T2.

Figure 11:
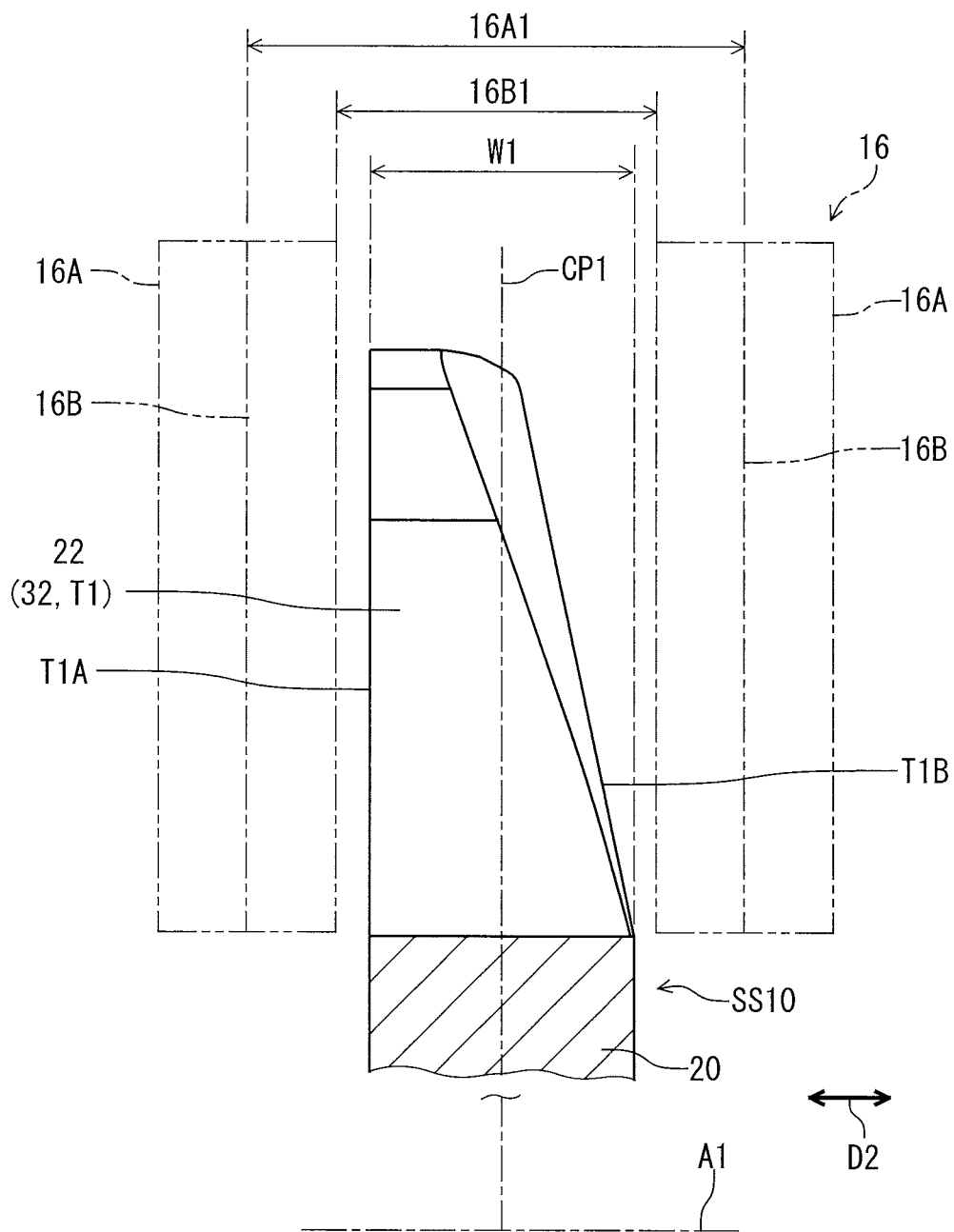
FIG. 11 is a cross-sectional view of the first sprocket taken along line XI-XI of FIG. 4.

As seen in FIG. 11, the at least one first tooth T1 has a first maximum axial width W1 and a first center plane CP1. The first maximum axial width W1 is defined in the axial direction D2 parallel to the rotational center axis A1. The first center plane CP1 is defined to bisect the first maximum axial width W1. The first tooth T1 includes a first chain-engagement surface T1A and a first additional chain-engagement surface T1B provided on a reverse side of the first chain-engagement surface T1A in the axial direction D2. The first maximum axial width W1 is defined between the first chain-engagement surface T1A and the first additional chain-engagement surface T1B in the axial direction D2.

Figure 12:
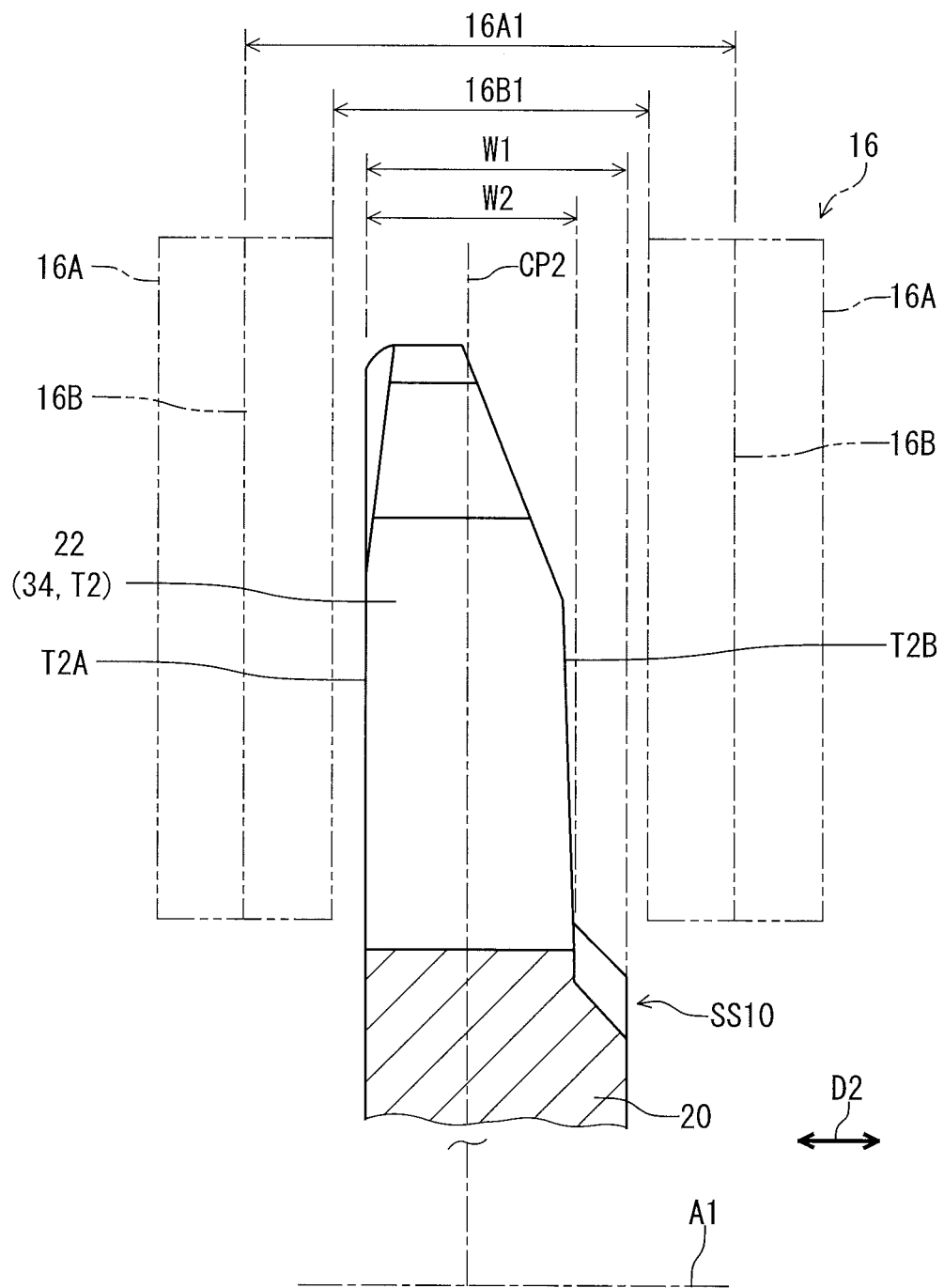
FIG. 12 is a cross-sectional view of the first sprocket taken along line XII-XII of FIG. 4.

As seen in FIG. 12, the at least one second tooth T2 has a second maximum axial width W2 and a second center plane CP2. The second maximum axial width W2 is defined in the axial direction D2. The second center plane CP2 is defined to bisect the second maximum axial width W2. The second tooth T2 includes a second chain-engagement surface T2A and a second additional chain-engagement surface T2B provided on a reverse side of the second chain-engagement surface T2A in the axial direction D2. The second maximum axial width W2 is defined between the second chain-engagement surface T2A and the second additional chain-engagement surface T2B in the axial direction D2.

As seen in FIGS. 11 and 12, the first center plane CP1 is offset from the second center plane CP2 in the axial direction D2. The first maximum axial width W1 is larger than the second maximum axial width W2. As seen in FIG. 11, the first tooth T1 is engageable with the inner link plates 16B in the first chain phase state ST1 (FIG. 8) and engageable with the outer link plates 16A in the second chain phase state ST2 (FIG. 9). As seen in FIG. 12, the second tooth T2 is engageable with the outer link plates 16A in the first chain phase state ST1 (FIG. 8) and engageable with the inner link plates 16B in the second chain phase state ST2 (FIG. 9).

The downshifting operation in the bicycle sprocket assembly 12 will be described below.

As seen in FIG. 3, the bicycle chain 16 is shifted by the derailleur DR from the eleventh speed sprocket SS11 toward the tenth speed sprocket SS10 in each of the first chain phase state and the second chain phase state. As seen in FIG. 8, the bicycle chain 16 is first received by the large-sprocket downshifting tooth 32 in the first chain phase state. As seen in FIG. 9, the bicycle chain 16 is first received by the additional large-sprocket downshifting tooth 34 in the second chain phase state.

As seen in FIG. 8, the downshifting facilitation recess 38 allows the inner link plate 16B of the bicycle chain 16 to come closer to the downshifting facilitation tooth 40 in the axial direction D2 in a state where the bicycle chain 16 is shifted toward the tenth speed sprocket SS10 in the first chain phase state ST1. This enables the large-sprocket downshifting tooth 32 to be smoothly inserted into the outer link space 16A1 of the opposed pair of outer link plates 16A of the bicycle chain 16. Thus, the bicycle chain 16 is first received by the large-sprocket downshifting tooth 32 in the first chain phase state. The additional large-sprocket downshifting tooth 34 is inserted into the inner link space 16B1 defined between the opposed pair of inner link plates 16B after engagement of the large-sprocket downshifting tooth 32. Other teeth of the tenth sprocket teeth 22 are alternately inserted into the outer link spaces 16A1 and the inner link spaces 16B1 of the bicycle chain 16 during rotation of the bicycle sprocket assembly 12.

As seen in FIG. 9, the downshifting facilitation recess 38 allows the outer link plate of the bicycle chain 16 to come closer to the downshifting facilitation tooth 40 in the axial direction D2 in a state where the bicycle chain 16 is shifted toward the tenth speed sprocket SS10 in the second chain phase state ST2. This enables the additional large-sprocket downshifting tooth 34 to be smoothly inserted into the outer link space 16A1 of the opposed pair of outer link plates 16A of the bicycle chain 16. Thus, the bicycle chain 16 is first received by the additional large-sprocket downshifting tooth 34 in the second chain phase state. Other teeth of the tenth sprocket teeth 22 are alternately inserted into the inner link spaces 16B1 and the outer link spaces 16A1 of the bicycle chain 16 during rotation of the bicycle sprocket assembly 12.

Figure 14:
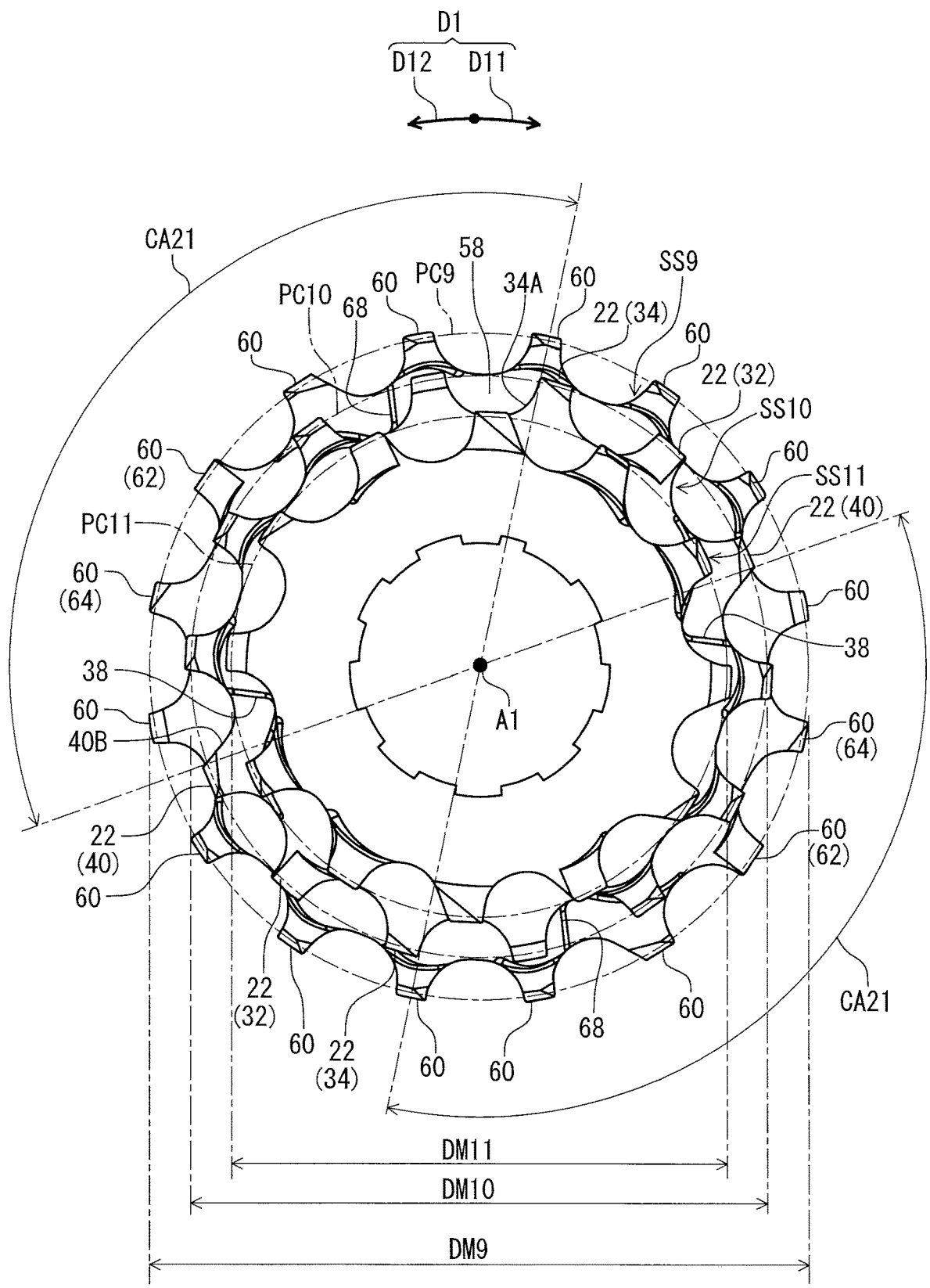
FIG. 14 is a side elevational view of the first to third sprockets of the bicycle sprocket assembly illustrated in FIG. 1 (option OP2).

As seen in FIG. 14, for example, the ninth to eleventh speed sprockets SS9 to SS11 can correspond to first to third sprockets. This corresponds to the option OP2 of FIG. 13. The ninth speed sprocket SS9 has substantially the same structure as that of the tenth speed sprocket SS10. In the option OP2, the tenth sprocket body 20, the plurality of tenth sprocket teeth 22, the tenth pitch circle PC10, and the tenth diameter DM10 correspond to the second sprocket body, the plurality of second sprocket teeth, the second pitch circle, and the second diameter, respectively. Furthermore, in the option OP2, the eleventh sprocket body 24, the plurality of eleventh sprocket teeth 26, the eleventh pitch circle PC11, and the eleventh diameter DM11 correspond to the third sprocket body, the plurality of third sprocket teeth, the third pitch circle, and the third diameter, respectively.

The ninth speed sprocket SS9 comprises a ninth sprocket body 58, a plurality of ninth sprocket teeth 60, and a ninth pitch circle PC9 having a ninth diameter DM9. In the option OP2, the ninth sprocket body 58, the plurality of ninth sprocket teeth 60, the ninth pitch circle PC9, and the ninth diameter DM9 correspond to the first sprocket body, the plurality of first sprocket teeth, the first pitch circle, and the first diameter, respectively. The ninth sprocket teeth 60 include large-sprocket downshifting teeth (downshifting teeth) 62 and additional large-sprocket downshifting teeth 64. The ninth speed sprocket SS9 includes downshifting facilitation recesses 68. The ninth sprocket body 58, the ninth sprocket teeth 60, the ninth pitch circle PC9, the large-sprocket downshifting tooth (the downshifting tooth) 62, the additional large-sprocket downshifting tooth 64, and the downshifting facilitation recess 68 have substantially the same structures as those of the tenth sprocket body 20, the tenth sprocket teeth 22, the tenth pitch circle PC10, the large-sprocket downshifting tooth (the downshifting tooth) 32, the additional large-sprocket downshifting tooth 34, and the downshifting facilitation recess 38 of the tenth speed sprocket SS10 (FIGS. 4 and 7).

The eleventh sprocket teeth 26 of the eleventh speed sprocket SS11 includes the first small-sprocket downshifting tooth 32 (one of the large-sprocket downshifting teeth 32, one of the downshifting teeth 32), the second small-sprocket downshifting tooth 32 (the other of the large-sprocket downshifting teeth 32, the other of the downshifting teeth 32), the first adjacent tooth 34 (one of the additional large-sprocket downshifting teeth 34), and the second adjacent tooth (one of the downshifting facilitation teeth 40).

A circumferential area CA21 is defined from a driving surface 34A of the first adjacent tooth 34 to a non-driving surface 40B of the second adjacent tooth 40 in the driving rotational direction D11 about the rotational center axis A1 when viewed in the axial direction D2. The circumferential area CA21 has an angle equal to or smaller than 180 degrees about the rotational center axis A1. The large-sprocket downshifting tooth 62 is disposed in the circumferential area CA21 when viewed in the axial direction D2. The additional large-sprocket downshifting tooth 64 is disposed in the circumferential area CA21 when viewed in the axial direction D2.

Figure 15:
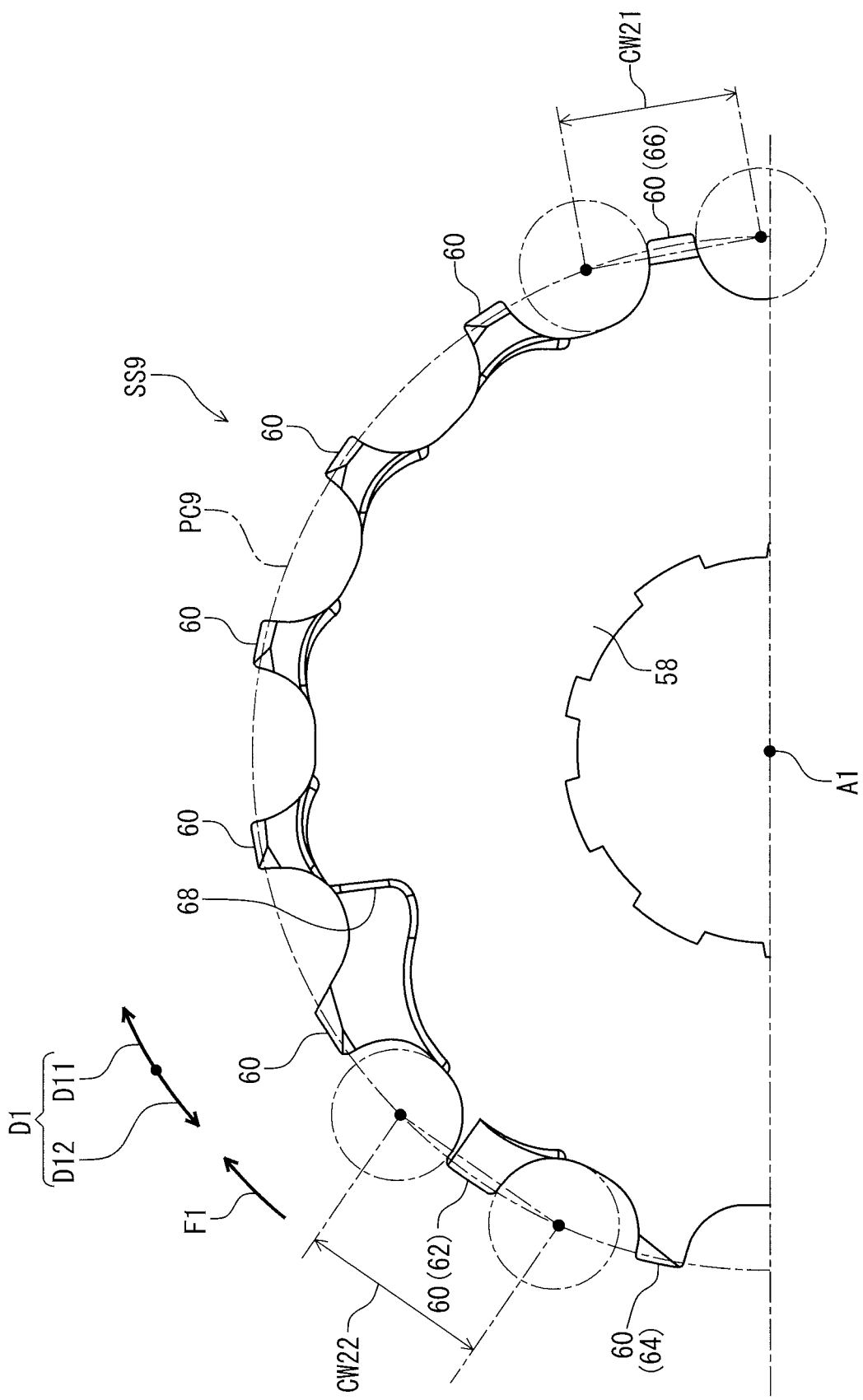
FIG. 15 is a partial side elevational view of the first sprocket of the bicycle sprocket assembly illustrated in FIG. 1 (option OP2).

As seen in FIG. 15, the ninth sprocket teeth 60 include a reference tooth 66. The reference tooth 66 has a reference circumferential width CW21 defined in the circumferential direction D1 with respect to the rotational center axis A1. The downshifting tooth 62 has a circumferential width CW22 defined in the circumferential direction D1. The reference circumferential width CW21 and the circumferential width CW22 are defined on the ninth pitch circle PC9 of the ninth speed sprocket SS9.

Figure 16:
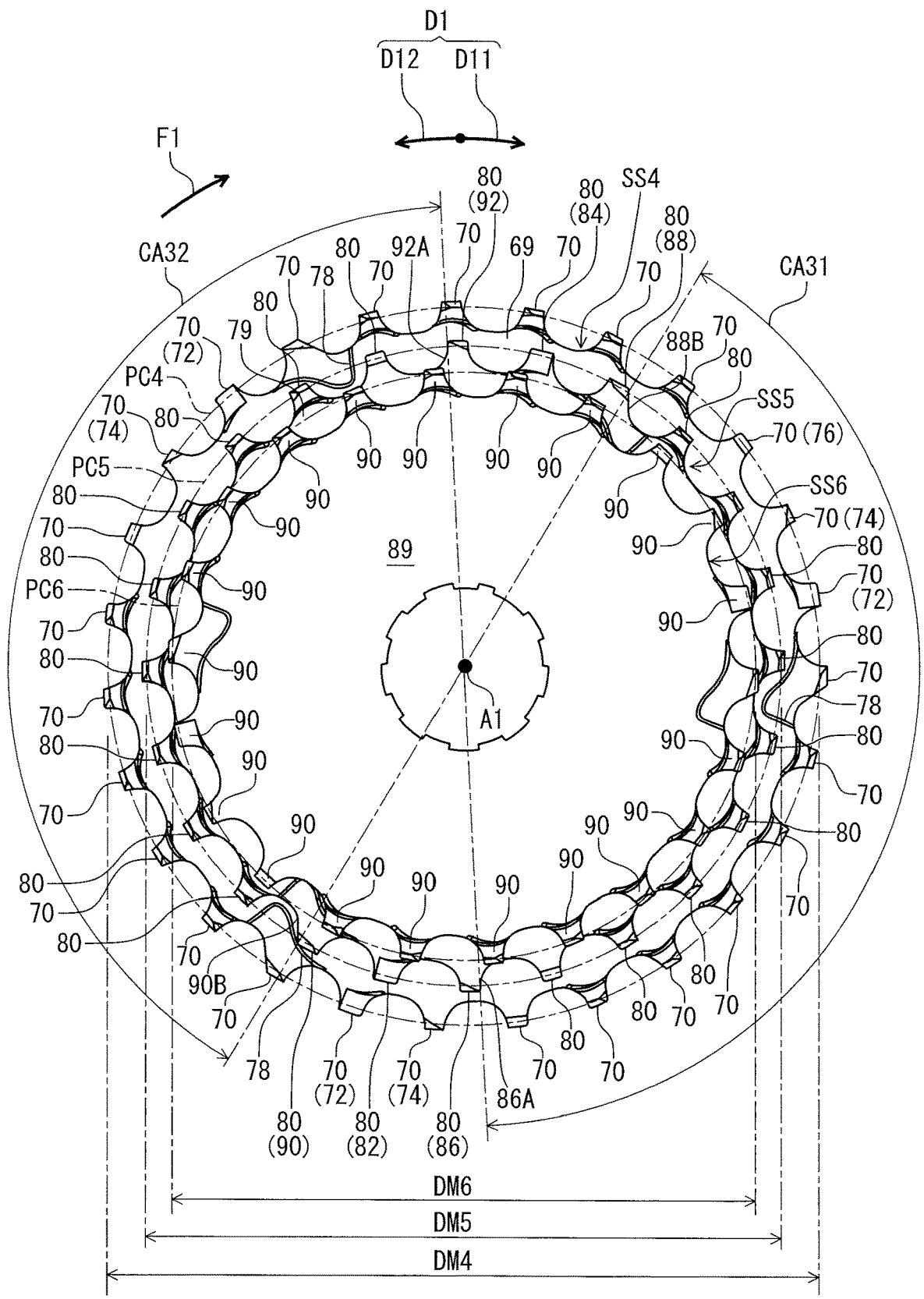
FIG. 16 is a side elevational view of the first to third sprockets of the bicycle sprocket assembly illustrated in FIG. 1 (option OP7).

Furthermore, as seen in FIG. 16, the fourth to sixth speed sprockets SS4 to SS6 can correspond to first to third sprockets. This corresponds to the option OP7 of FIG. 13. As seen in FIG. 13, the tooth-number difference TND1 is equal to three.

As seen in FIG. 16, the fourth speed sprocket SS4 comprises a fourth sprocket body 69, a plurality of fourth sprocket teeth 70, and a fourth pitch circle PC4 having a fourth diameter DM4. In the option OP7, the fourth sprocket body 69, the plurality of fourth sprocket teeth 70, the fourth pitch circle PC4, and the fourth diameter DM4 correspond to the first sprocket body, the plurality of first sprocket teeth, the first pitch circle, and the first diameter, respectively. The fourth sprocket teeth 70 include large-sprocket downshifting teeth (downshifting teeth) 72 and additional large-sprocket downshifting teeth 74. The fourth speed sprocket SS4 includes downshifting facilitation recesses 78. The fourth sprocket body 69, the fourth sprocket teeth 70, the fourth pitch circle PC4, the large-sprocket downshifting tooth (the downshifting tooth) 72, the additional large-sprocket downshifting tooth 74, and the downshifting facilitation recess 78 have substantially the same structures as those of the tenth sprocket body 20, the tenth sprocket teeth 22, the tenth pitch circle PC10, the large-sprocket downshifting tooth (the downshifting tooth) 32, the additional large-sprocket downshifting tooth 34, and the downshifting facilitation recess 38 of the tenth speed sprocket SS10 (FIGS. 4 and 7).

The fifth speed sprocket SS5 comprises a fifth sprocket body 79, a plurality of fifth sprocket teeth 80, and a fifth pitch circle PC5 having a fifth diameter DM5. In the option OP7, the fifth sprocket body 79, the plurality of fifth sprocket teeth 80, the fifth pitch circle PC5, and the fifth diameter DM5 correspond to the second sprocket body, the plurality of second sprocket teeth, the second pitch circle, and the second diameter, respectively. The fifth sprocket teeth 80 of the fifth speed sprocket SS5 includes a first small-sprocket downshifting tooth 82, a second small-sprocket downshifting tooth 84, a first adjacent tooth 86, a second adjacent tooth 88, a third adjacent tooth 90, and a fourth adjacent tooth 92. The first small-sprocket downshifting tooth 82, the second small-sprocket downshifting tooth 84, the first adjacent tooth 86, the second adjacent tooth 88, the third adjacent tooth 90, and the fourth adjacent tooth 92 have substantially the same structures as those of the first small-sprocket downshifting tooth 44, the second small-sprocket downshifting tooth 46, the first adjacent tooth 48, the second adjacent tooth 50, the third adjacent tooth 52, and the fourth adjacent tooth 54 of the eleventh speed sprocket SS11 (FIGS. 5 and 7).

The sixth speed sprocket SS6 comprises a sixth sprocket body 89, a plurality of sixth sprocket teeth 90, and a sixth pitch circle PC6 having a sixth diameter DM6. In the option OP7, the sixth sprocket body 89, the plurality of sixth sprocket teeth 90, the sixth pitch circle PC6, and the sixth diameter DM6 correspond to the third sprocket body, the plurality of third sprocket teeth, the third pitch circle, and the third diameter, respectively.

A circumferential area CA31 is defined from a driving surface 86A of the first adjacent tooth 86 to a non-driving surface 88B of the second adjacent tooth 88 in the driving rotational direction D11 about the rotational center axis A1 when viewed in the axial direction D2. The circumferential area CA31 has an angle equal to or smaller than 180 degrees about the rotational center axis A1. One of the large-sprocket downshifting teeth 72 is disposed in the circumferential area CA31 when viewed in the axial direction D2. One of the additional large-sprocket downshifting teeth 74 is disposed in the circumferential area CA31 when viewed in the axial direction D2.

An additional circumferential area CA32 is defined from a non-driving surface 90B of the third adjacent tooth 90 to a driving surface 92A of the fourth adjacent tooth 92 in the driving rotational direction D11 about the rotational center axis A1 when viewed in the axial direction D2. The additional circumferential area CA32 has an angle equal to or smaller than 180 degrees about the rotational center axis A1. Another of the large-sprocket downshifting teeth 72 is disposed in the additional circumferential area CA32 when viewed in the axial direction D2. Another of the additional large-sprocket downshifting teeth 74 is disposed in the additional circumferential area CA32 when viewed in the axial direction D2.

Figure 17:
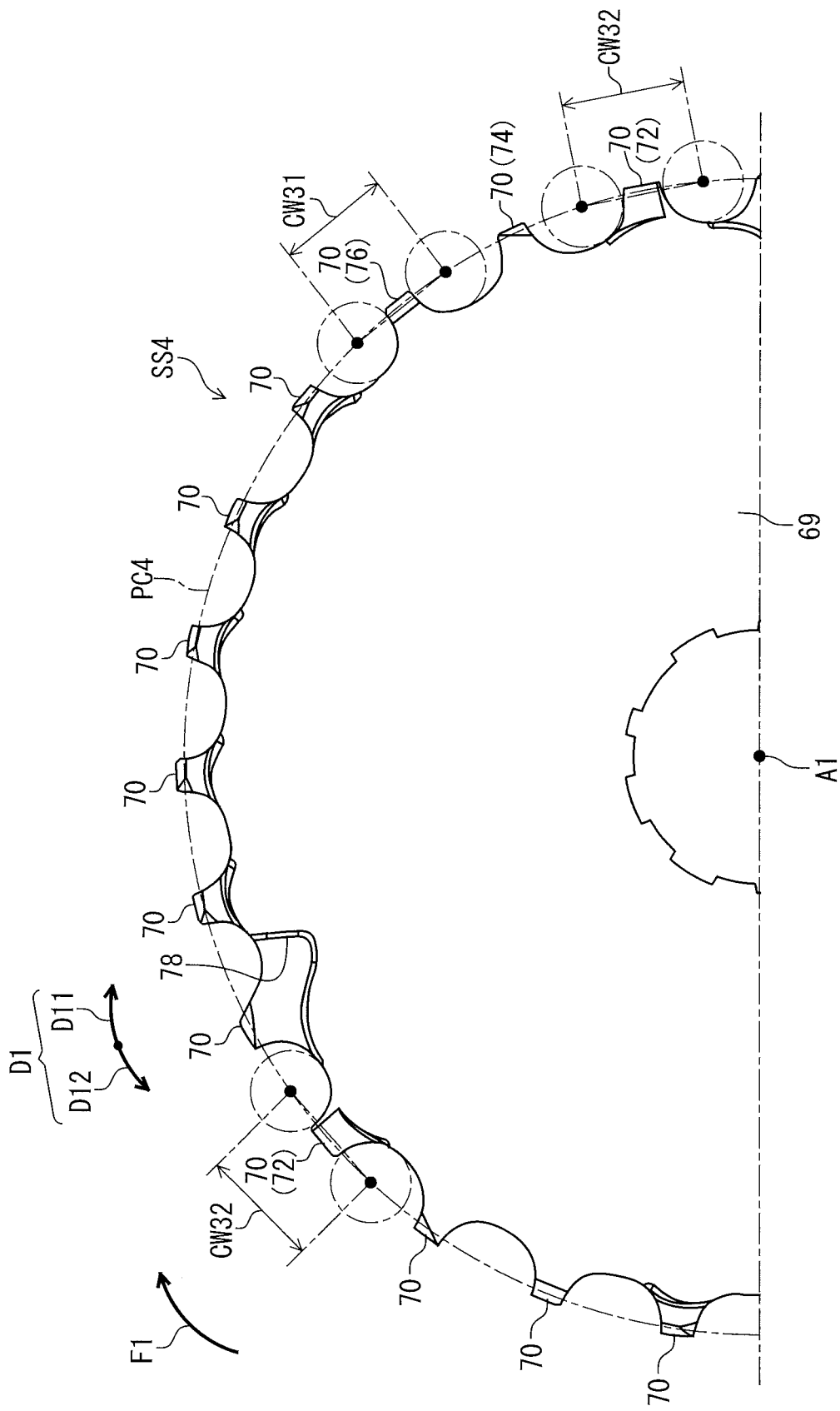
FIG. 17 is a partial side elevational view of the first sprocket of the bicycle sprocket assembly illustrated in FIG. 1 (option OP7).

As seen in FIG. 17, the fourth sprocket teeth 70 include a reference tooth 76. The reference tooth 76 has a reference circumferential width CW31 defined in the circumferential direction D1 with respect to the rotational center axis A1. The downshifting tooth 72 has a circumferential width CW32 defined in the circumferential direction D1. The reference circumferential width CW31 and the circumferential width CW32 are defined on the fourth pitch circle PC4 of the fourth speed sprocket SS4.

Other options have substantially the same features as those of the above described options. Thus, the other options will not be described in detail here for the sake of brevity.

Second Embodiment

A bicycle drive train 210 comprising a bicycle sprocket assembly 212 in accordance with a second embodiment will be described below referring to FIGS. 18 to 21. The bicycle drive train 210 has the same structure as that of the bicycle drive train 10 except for the bicycle sprocket assembly 212. Thus, elements having substantially the same function as those in the first embodiment will be numbered the same here, and will not be described and/or illustrated again in detail here for the sake of brevity.

Figure 18:
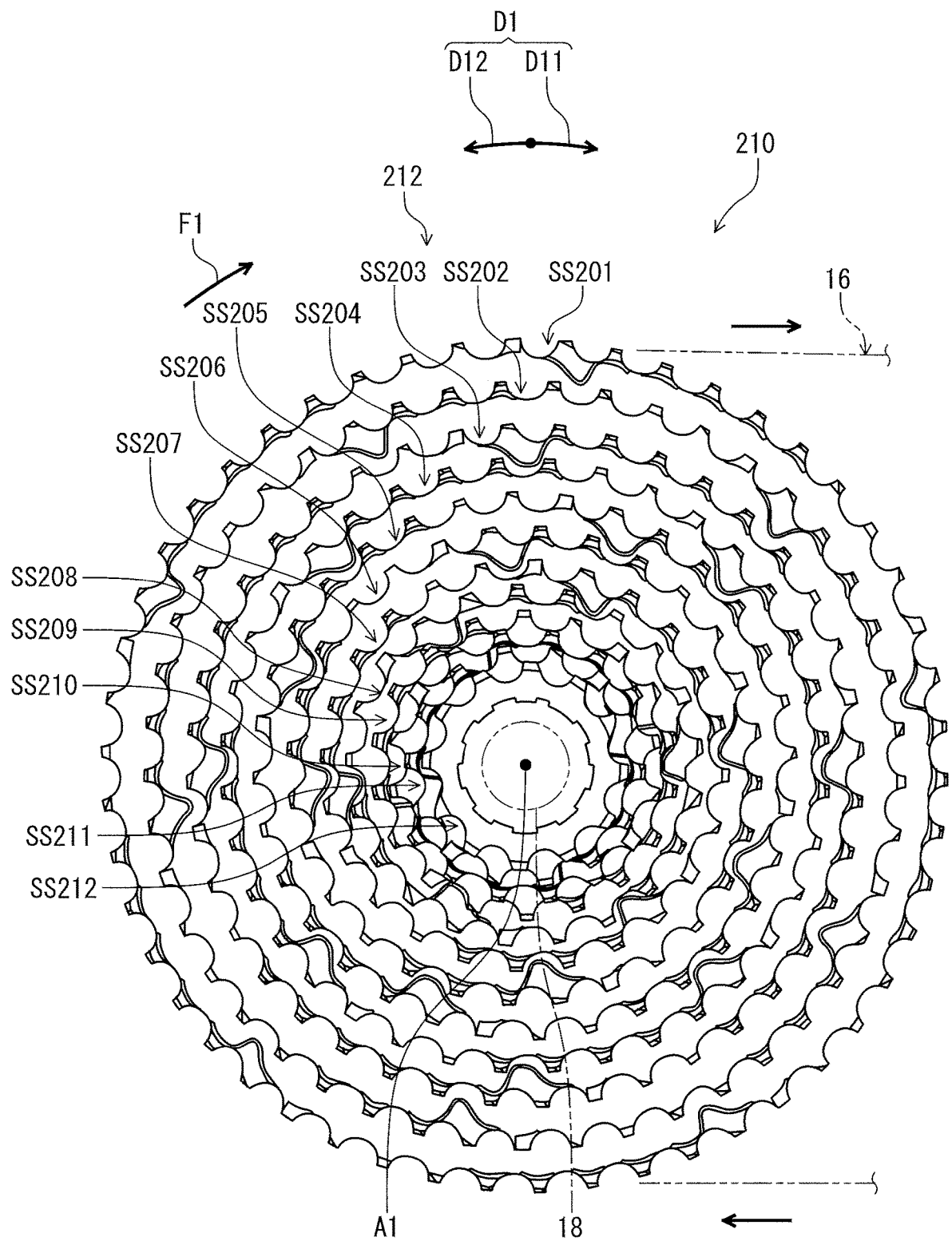
FIG. 18 is a side elevational view of a bicycle sprocket assembly of a bicycle drive train in accordance with a second embodiment.

As seen in FIG. 18, the bicycle sprocket assembly 212 comprises first to twelfth speed sprockets SS201 to SS212. The first to twelfth speed sprockets SS201 to SS212 have substantially the same structure as those of the first to twelfth speed sprockets SS1 to SS12. However, a total number of sprocket teeth in each of the first to twelfth speed sprockets SS201 to SS212 is different from the total number of sprocket teeth in each of the first to twelfth speed sprockets SS1 to SS12.

FIG. 19 shows the total number of sprocket teeth in each of the first to twelfth speed sprockets SS201 to SS212. The bicycle sprocket assembly 212 comprises a largest sprocket having a maximum total number of sprocket teeth which is equal to or larger than forty-six. In this embodiment, the maximum total number of sprocket teeth is equal to or larger than fifty. The maximum total number of sprocket teeth is equal to fifty. The first speed sprocket SS201 is the largest sprocket SS201.

In this embodiment, the tenth to twelfth speed sprockets SS210 to SS212 will be described in detail below. The tenth speed sprocket SS210, the eleventh speed sprocket SS211, and the twelfth speed sprocket SS212 can correspond to a first sprocket, a second sprocket, and a third sprocket, respectively. Namely, the bicycle sprocket assembly 212 comprises the first sprocket, the second sprocket, and the third sprocket.

Figure 20:
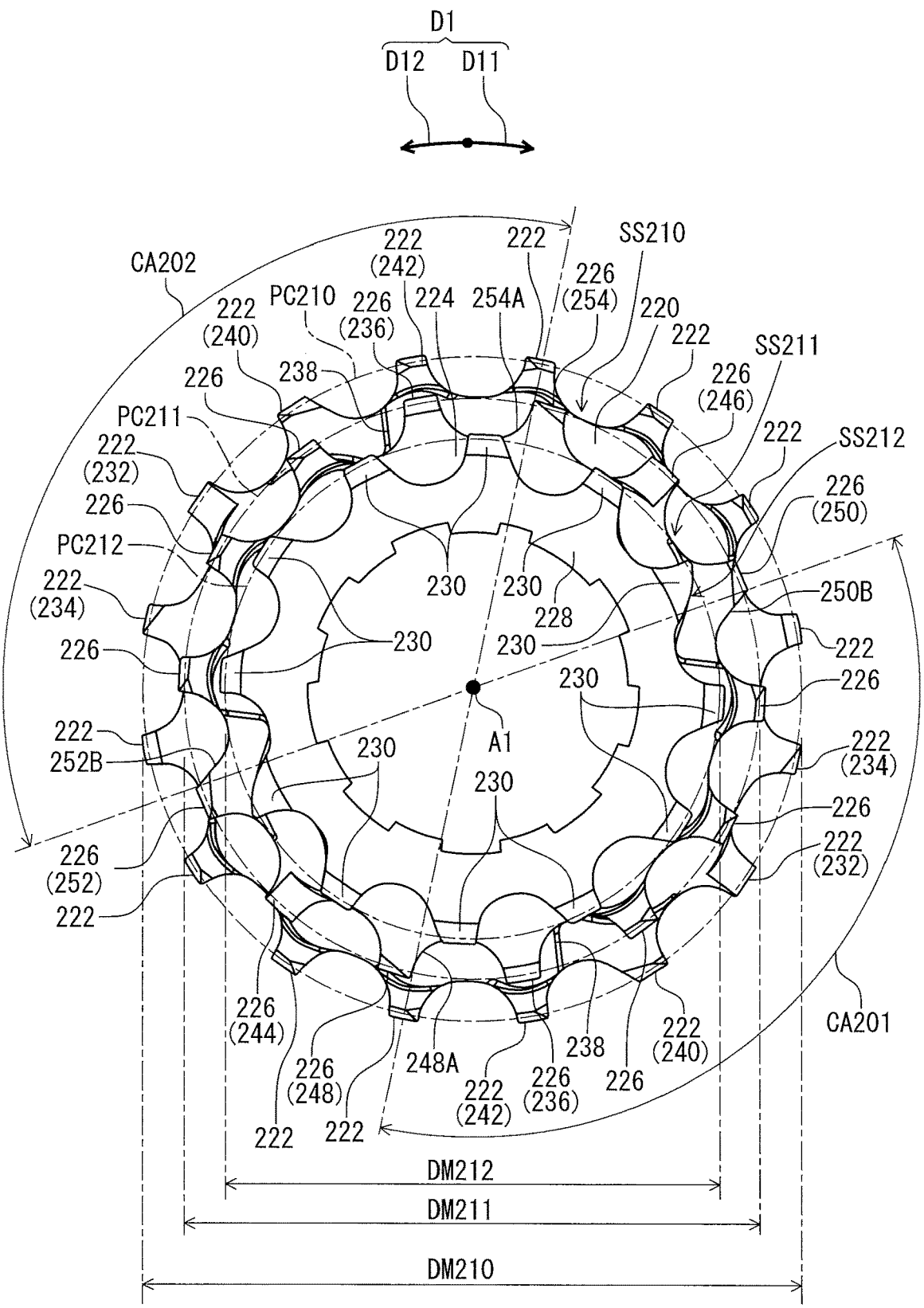
FIG. 20 is a side elevational view of the first to third sprockets of the bicycle sprocket assembly illustrated in FIG. 18 (option OP1).

As seen in FIG. 20, the tenth to twelfth speed sprockets SS210 to SS212 have substantially the same structures as those of the tenth to twelfth speed sprockets SS10 to SS12 of the first embodiment. The tenth speed sprocket SS210 includes a tenth sprocket body 220 and a plurality of tenth sprocket teeth 222. The tenth sprocket body 220 and the plurality of tenth sprocket teeth 222 correspond to the first sprocket body and the plurality of first sprocket teeth, respectively. The tenth speed sprocket SS210 includes a tenth pitch circle PC210 having a tenth diameter DM210. The tenth pitch circle PC210 and the tenth diameter DM210 correspond to the first pitch circle and the first diameter, respectively. The tenth sprocket body 220 and the tenth sprocket teeth 222 have substantially the same structures as those of the tenth sprocket body 20 and the tenth sprocket teeth 22 of the tenth speed sprocket SS10 of the first embodiment.

A total number of the tenth sprocket teeth 222 is equal to or less than 24. The total number of the tenth sprocket teeth 222 is equal to or larger than 14. In this embodiment, the total number of the tenth sprocket teeth 222 is equal to 16. However, the total number of the tenth sprocket teeth 222 is not limited to this embodiment.

As seen in FIG. 20, the eleventh speed sprocket SS211 includes an eleventh sprocket body 224 and a plurality of eleventh sprocket teeth 226. The eleventh sprocket body 224 and the plurality of eleventh sprocket teeth 226 can correspond to the second sprocket body and the plurality of second sprocket teeth, respectively. The eleventh speed sprocket SS211 includes an eleventh pitch circle PC211 having an eleventh diameter DM211. The eleventh pitch circle PC211 and the eleventh diameter DM211 can correspond to the second pitch circle and the second diameter, respectively. The eleventh sprocket body 224 and the eleventh sprocket teeth 226 have substantially the same structures as those of the eleventh sprocket body 24 and the eleventh sprocket teeth 26 of the eleventh speed sprocket SS11 of the first embodiment. In this embodiment, a total number of the eleventh sprocket teeth 226 is 14. However, the total number of the eleventh sprocket teeth 226 is not limited to this embodiment.

As seen in FIG. 20, the twelfth speed sprocket SS212 comprises a twelfth sprocket body 228 and a plurality of twelfth sprocket teeth 230. The twelfth speed sprocket SS212 includes a twelfth pitch circle PC212 having a twelfth diameter DM212. The twelfth sprocket body 228 and the twelfth sprocket teeth 230 have substantially the same structures as those of the twelfth sprocket body 28 and the twelfth sprocket teeth 30 of the twelfth speed sprocket SS12 of the first embodiment. In this embodiment, the total number of the twelfth sprocket teeth 230 is equal to 12. However, the total number of the twelfth sprocket teeth 230 is not limited to this embodiment.

As seen in FIG. 19, the total number of the eleventh sprocket teeth 226 is smaller than the total number of the tenth sprocket teeth 222 by a tooth-number difference TND2 that is equal to or less than five. In this embodiment, the tooth-number difference TND2 is equal to two since the total number of the tenth sprocket teeth 222 is 16 and the total number of the eleventh sprocket teeth 226 is 14. However, the tooth-number difference TND2 is not limited to this embodiment.

The total number of the twelfth sprocket teeth 230 is smaller than the total number of the tenth sprocket teeth 222 by the tooth-number difference TND2 that is equal to or less than five. In this embodiment, the tooth-number difference TND2 is equal to two since the total number of the eleventh sprocket teeth 226 is 14 and the total number of the twelfth sprocket teeth 230 is 12. However, the tooth-number difference TND2 is not limited to this embodiment.

As seen in FIG. 20, the tenth sprocket teeth 222 include a large-sprocket downshifting tooth (a downshifting tooth) 232 and an additional large-sprocket downshifting tooth (an additional downshifting tooth) 234. The tenth sprocket teeth 222 includes a chain-phase reference tooth 236 and downshifting facilitation tooth 240. The tenth speed sprocket SS210 includes a downshifting facilitation recess 238. The large-sprocket downshifting tooth (the downshifting tooth) 232, the additional large-sprocket downshifting tooth (the additional downshifting tooth) 234, the chain-phase reference tooth 236, the downshifting facilitation recess 238, and the downshifting facilitation tooth 240 have substantially the same structures as those of the large-sprocket downshifting tooth (the downshifting tooth) 32, the additional large-sprocket downshifting tooth (the additional downshifting tooth) 34, the chain-phase reference tooth 36, the downshifting facilitation recess 38, and the downshifting facilitation tooth 40 of the tenth speed sprocket SS10 of the first embodiment.

In this embodiment, the tenth sprocket teeth 222 include a plurality of large-sprocket downshifting teeth 232, a plurality of additional large-sprocket downshifting teeth 234, and a plurality of downshifting facilitation teeth 240. The tenth speed sprocket SS210 includes a plurality of downshifting facilitation recesses 238. However, the tenth sprocket teeth 222 can includes only one large-sprocket downshifting tooth 232 or at least three large-sprocket downshifting teeth 232. The tenth sprocket teeth 222 can includes only one additional large-sprocket downshifting tooth 234 or at least three additional large-sprocket downshifting teeth 234. The tenth sprocket teeth 222 can includes only one downshifting facilitation tooth 240 or at least three downshifting facilitation teeth 240. The tenth speed sprocket SS210 can include only one downshifting facilitation recess 238 or at least three downshifting facilitation recesses 238.

Figure 21:
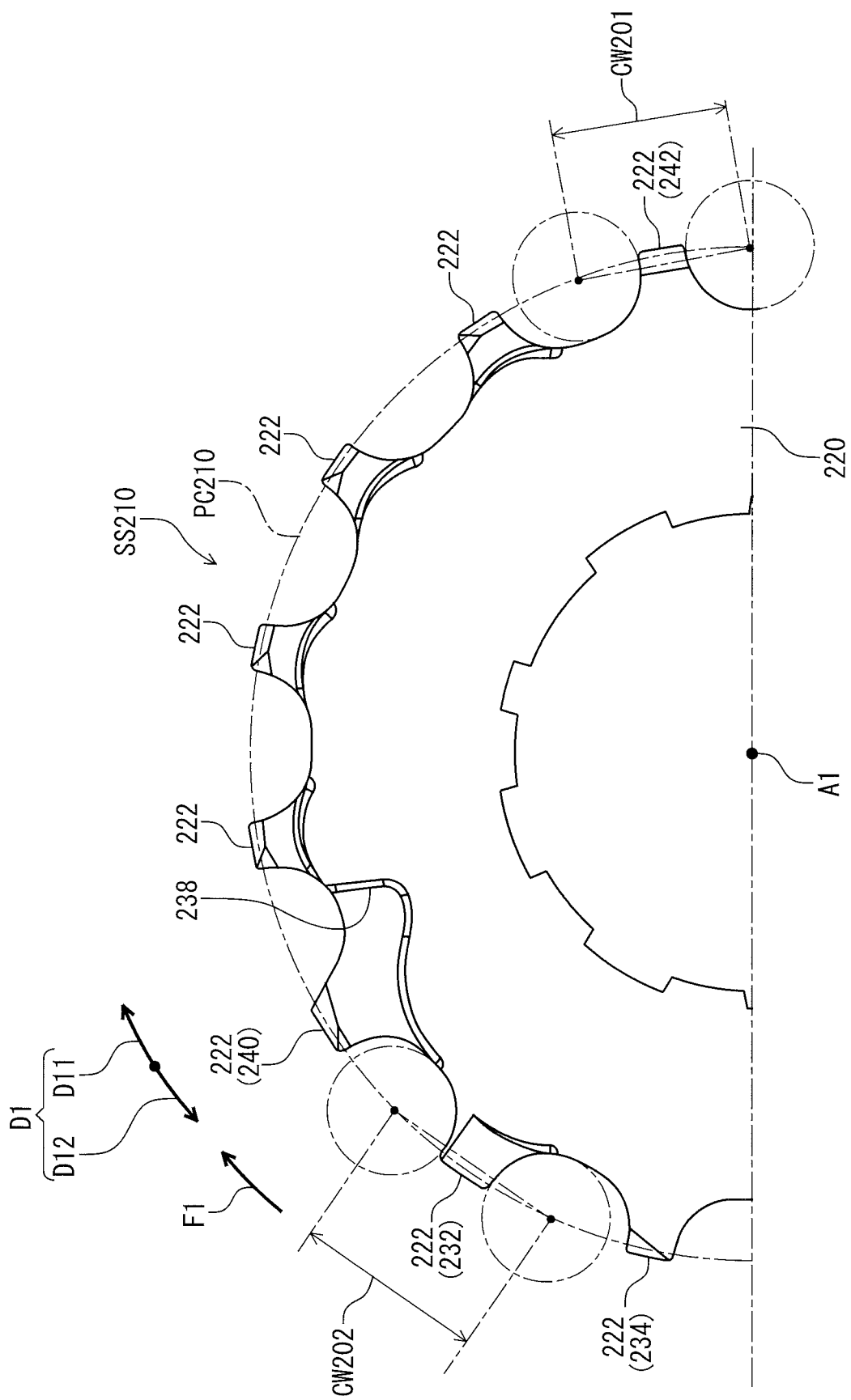
FIG. 21 is a partial side elevational view of the first sprocket of the bicycle sprocket assembly illustrated in FIG. 18 (option OP1).

As seen in FIG. 21, the tenth sprocket teeth 222 include a reference tooth 242. The reference tooth 242 has substantially the same structure as that of the reference tooth 42 of the tenth speed sprocket SS10 of the first embodiment. The reference tooth 242 has a reference circumferential width CW201 defined in the circumferential direction D1 with respect to the rotational center axis A1. The downshifting tooth 232 has a circumferential width CW202 defined in the circumferential direction D1. The reference circumferential width CW201 and the circumferential width CW202 are defined on the tenth pitch circle PC210 of the tenth speed sprocket SS210. The circumferential width CW202 is larger than the reference circumferential width CW201. The circumferential width CW202 is equal to or larger than 3.6 mm. The circumferential width CW202 is equal to or smaller than 3.8 mm. In this embodiment, the circumferential width CW202 is equal to 3.68 mm, and the reference circumferential width CW201 is equal to 3.42 mm. However, the reference circumferential width CW201 and the circumferential width CW202 are not limited to this embodiment. For example, if the total number of the tenth sprocket teeth 222 gets larger from 17, the reference circumferential width CW201 gets smaller while the circumferential width CW202 is substantially constant in each sprocket.

As seen in FIG. 20, the eleventh sprocket teeth 226 include a first small-sprocket downshifting tooth 244, a second small-sprocket downshifting tooth 246, a first adjacent tooth 248, a second adjacent tooth 250, a third adjacent tooth 252, and a fourth adjacent tooth 254. The first small-sprocket downshifting tooth 244, the second small-sprocket downshifting tooth 246, the first adjacent tooth 248, the second adjacent tooth 250, the third adjacent tooth 252, and the fourth adjacent tooth 254 have substantially the same structures as those of the first small-sprocket downshifting tooth 44, the second small-sprocket downshifting tooth 46, the first adjacent tooth 48, the second adjacent tooth 50, the third adjacent tooth 52, and the fourth adjacent tooth 54.

A circumferential area CA201 is defined from a driving surface 248A of the first adjacent tooth 248 to a non-driving surface 250B of the second adjacent tooth 250 in the driving rotational direction D11 about the rotational center axis A1 when viewed in the axial direction D2. The circumferential area CA201 has an angle equal to or smaller than 180 degrees about the rotational center axis A1.

As seen in FIG. 20, the large-sprocket downshifting tooth 232 is disposed in the circumferential area CA201 when viewed in the axial direction D2. One of the large-sprocket downshifting teeth 232 is disposed in the circumferential area CA201 when viewed in the axial direction D2. In this embodiment, the large-sprocket downshifting tooth 232 is entirely disposed in the circumferential area CA201 when viewed in the axial direction D2. However, the large-sprocket downshifting tooth 232 can be partly disposed in the circumferential area CA201 when viewed in the axial direction D2.

The additional large-sprocket downshifting tooth 234 is disposed in the circumferential area CA201 when viewed in the axial direction D2. One of the additional large-sprocket downshifting teeth 234 is disposed in the circumferential area CA201 when viewed in the axial direction D2. The additional large-sprocket downshifting tooth 234 is partly disposed in the circumferential area CA201 when viewed in the axial direction D2. However, the additional large-sprocket downshifting tooth 234 can be entirely disposed in the circumferential area CA201 when viewed in the axial direction D2. At least one of the large-sprocket downshifting tooth 232 and the additional large-sprocket downshifting tooth 234 can be disposed outside the circumferential area CA201 when viewed in the axial direction D2.

An additional circumferential area CA202 is defined from a non-driving surface 252B of the third adjacent tooth 252 to a driving surface 254A of the fourth adjacent tooth 254 in the driving rotational direction D11 about the rotational center axis A1 when viewed in the axial direction D2. The additional circumferential area CA202 has an angle equal to or smaller than 180 degrees about the rotational center axis A1.

As seen in FIG. 20, the other of the large-sprocket downshifting teeth 232 is disposed in the additional circumferential area CA202 when viewed in the axial direction D2. In this embodiment, the other of the large-sprocket downshifting teeth 232 is entirely disposed in the additional circumferential area CA202 when viewed in the axial direction D2. However, the large-sprocket downshifting tooth 232 can be partly disposed in the additional circumferential area CA202 when viewed in the axial direction D2.

The other of the additional large-sprocket downshifting teeth 234 is disposed in the additional circumferential area CA202 when viewed in the axial direction D2. The other of the additional large-sprocket downshifting teeth 234 is partly disposed in the additional circumferential area CA202 when viewed in the axial direction D2. However, the additional large-sprocket downshifting tooth 234 can be entirely disposed in the additional circumferential area CA202 when viewed in the axial direction D2. At least one of the large-sprocket downshifting tooth 232 and the additional large-sprocket downshifting tooth 234 can be disposed outside the additional circumferential area CA202 when viewed in the axial direction D2.

As seen in FIG. 19, for example, the first to tenth speed sprockets SS201 to SS210 can also be referred to as the first sprocket. The second to eleventh speed sprockets SS202 to SS211 can also be referred to as the second sprocket. The third to twelfth speed sprockets SS203 to SS212 can also be referred to as the third sprocket.

Third Embodiment

A bicycle drive train 310 comprising a bicycle sprocket assembly 312 in accordance with a third embodiment will be described below referring to FIGS. 22 to 24. The bicycle drive train 310 has the same structure as that of the bicycle drive train 10 except for the bicycle sprocket assembly 312. Thus, elements having substantially the same function as those in the above embodiments will be numbered the same here, and will not be described and/or illustrated again in detail here for the sake of brevity.

Figure 22:
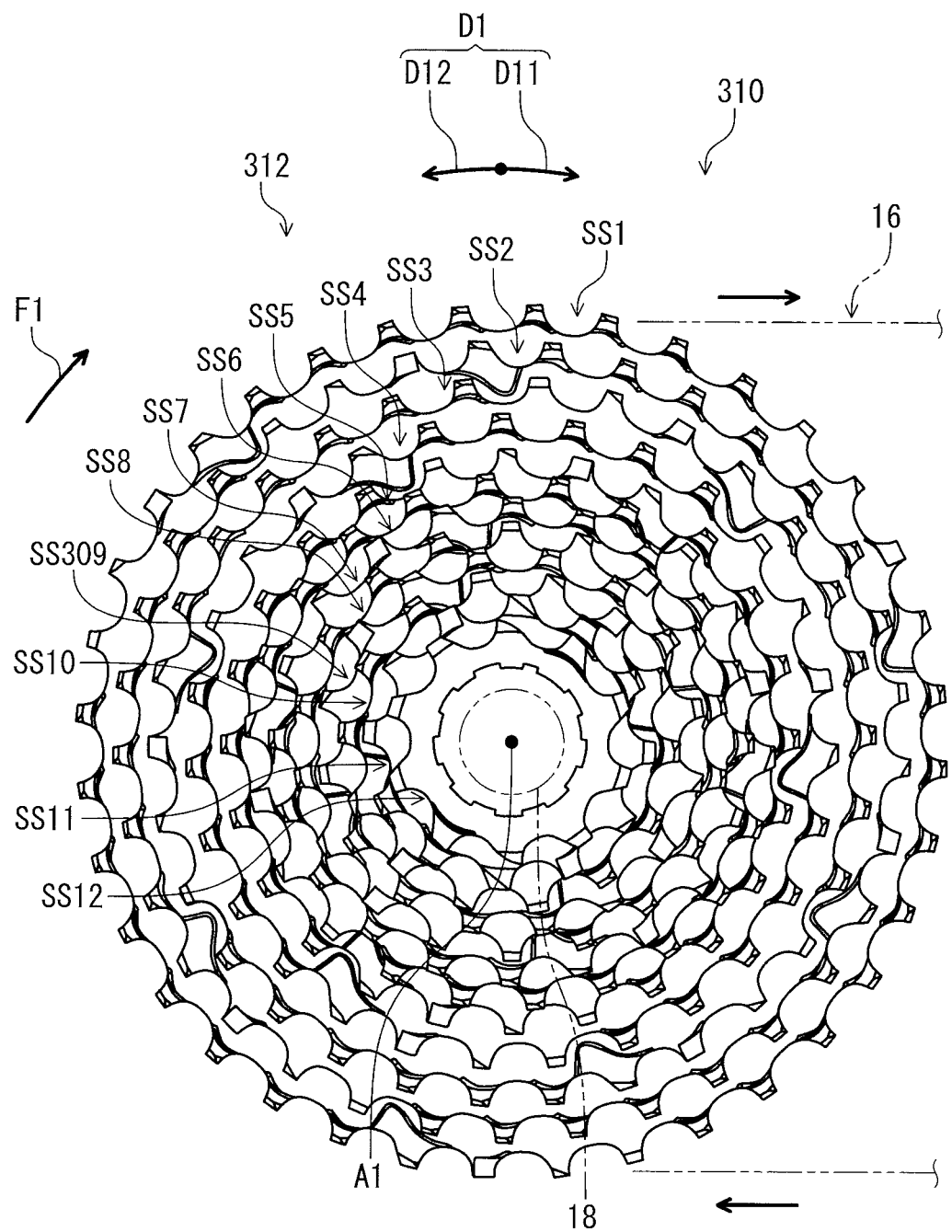
FIG. 22 is a side elevational view of a bicycle sprocket assembly of a bicycle drive train in accordance with a third embodiment.

As seen in FIG. 22, the bicycle sprocket assembly 312 comprises a ninth speed sprocket SS309. The ninth speed sprocket SS309 can correspond to a first sprocket. The bicycle sprocket assembly 312 has substantially the same structure as that of the bicycle sprocket assembly 12 of the first embodiment except for the ninth speed sprocket SS309.

Figure 23:
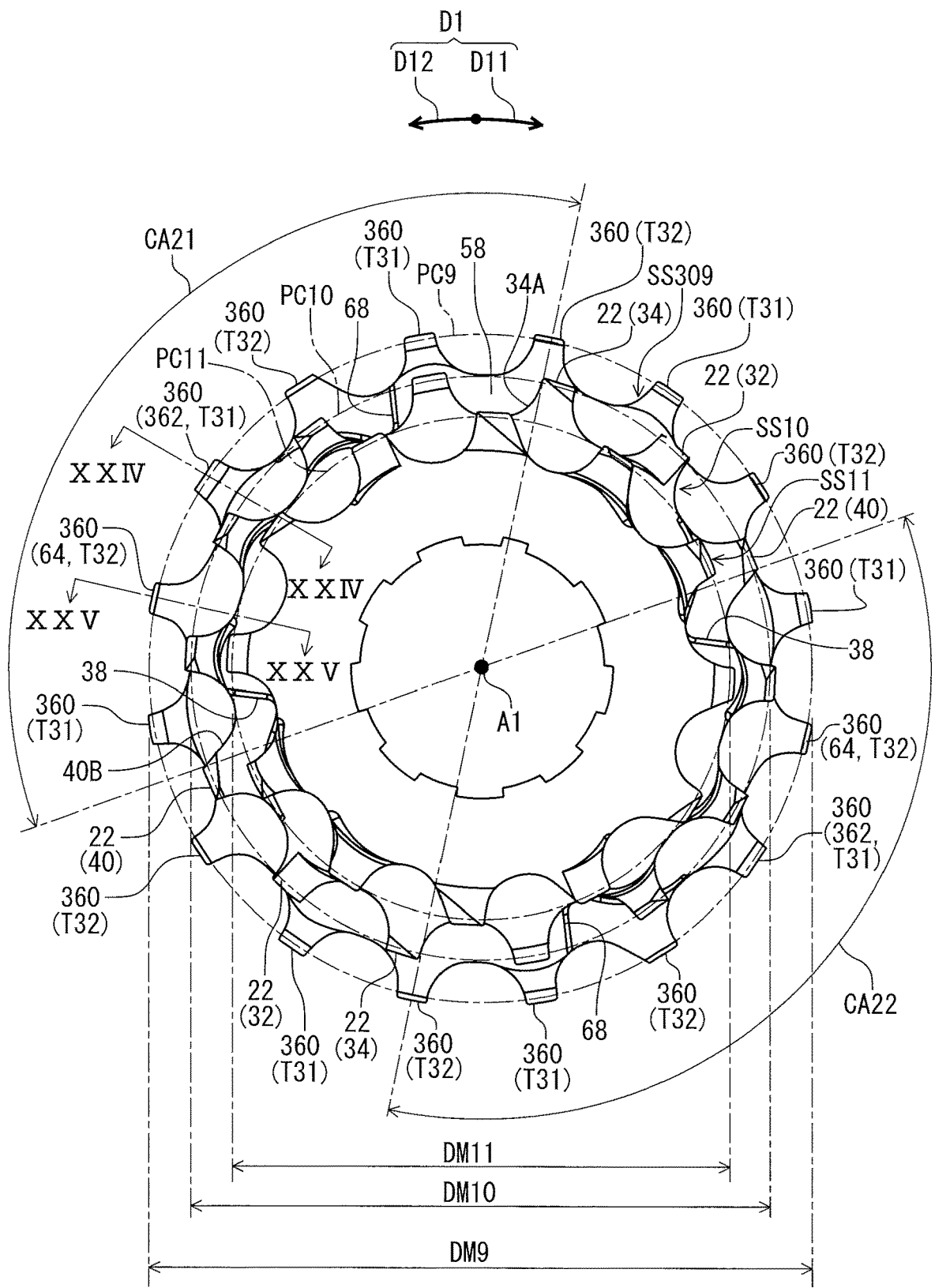
FIG. 23 is a partial side elevational view of a first sprocket of the bicycle sprocket assembly illustrated in FIG. 22.

As seen in FIG. 23, the ninth speed sprocket SS309 includes the ninth sprocket body 58 and a plurality of ninth sprocket teeth 360. The ninth sprocket teeth 360 have substantially the same structure as those of the ninth sprocket teeth 60 of the ninth speed sprocket SS9 of the first embodiment. In this embodiment, the ninth sprocket teeth 360 include the large-sprocket downshifting tooth 362 to first receive the bicycle chain 16 from the tenth speed sprocket SS10 in the first chain phase state ST1 in which the bicycle chain 16 is shifted from the tenth speed sprocket SS10 to the ninth speed sprocket SS309. The large-sprocket downshifting tooth 362 has substantially the same structure as that of the large-sprocket downshifting tooth 62 of the ninth speed sprocket SS9 of the first embodiment. In this embodiment, the large-sprocket downshifting tooth 362 is engageable with only the outer link space 16A1 (FIG. 8) of the bicycle chain 16. Namely, the tenth speed sprocket SS10 has only the first chain phase state ST1 while the tenth speed sprocket SS10 has substantially the same structure as that of the tenth speed sprocket SS10 of the first embodiment. The large-sprocket downshifting tooth 362 is disposed in the circumferential area CA21 when viewed in the axial direction D2.

The ninth sprocket teeth 360 include at least one first tooth T31 and at least one second tooth T32. In this embodiment, the ninth sprocket teeth 360 include first teeth T31 and second teeth T32. The large-sprocket downshifting tooth 362 corresponds the first tooth T31. The additional large-sprocket downshifting tooth 64 corresponds to the second tooth T32.

Figure 24:
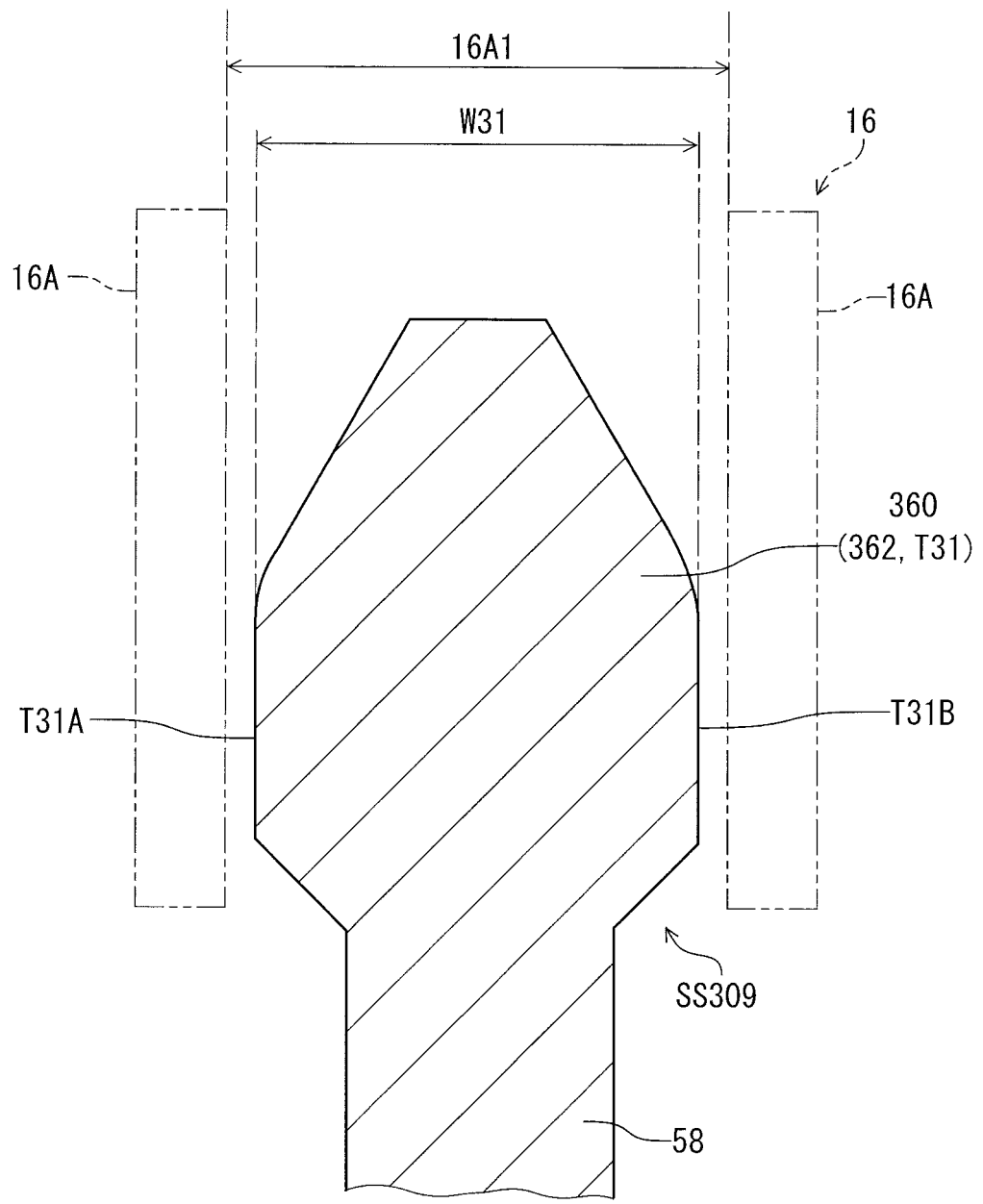
FIG. 24 is a cross-sectional view of the first sprocket taken along line XXIV-XXIV of FIG. 23.

As seen in FIG. 24, the at least one first tooth T31 has a first maximum axial width W31 defined in the axial direction D2 parallel to the rotational center axis A1. The first tooth T31 includes a first chain-engagement surface T31A and a first additional chain-engagement surface T31B provided on a reverse side of the first chain-engagement surface T31A in the axial direction D2. The first maximum axial width W31 is defined between the first chain-engagement surface T31A and the first additional chain-engagement surface T31B in the axial direction D2.

Figure 25:
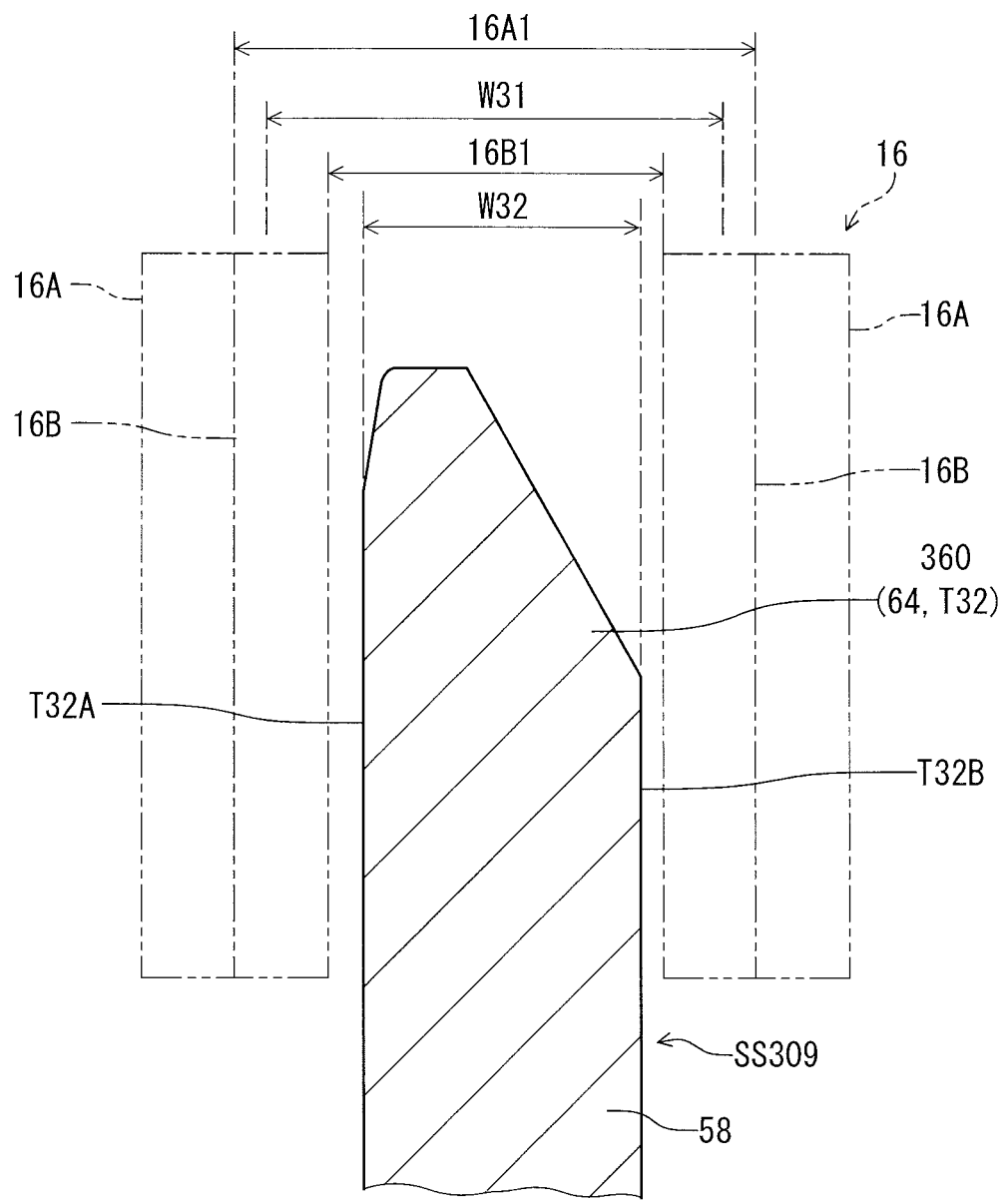
FIG. 25 is a cross-sectional view of the first sprocket taken along line XXV-XXV of FIG. 23.

As seen in FIG. 25, the at least one second tooth T32 has a second maximum axial width W32 defined in the axial direction D2. The second tooth T32 includes a second chain-engagement surface T32A and a second additional chain-engagement surface T32B provided on a reverse side of the second chain-engagement surface T32A in the axial direction D2. The second maximum axial width W32 is defined between the second chain-engagement surface T32A and the second additional chain-engagement surface T32B in the axial direction D2.

The first maximum axial width W31 is larger than the second maximum axial width W32. The first maximum axial width W31 is larger than an axial length of the inner link space 16B1 and is smaller than an axial length of the outer link space 16A1. The second maximum axial width W32 is smaller than the axial length of the inner link space 16B1. Thus, as seen in FIG. 24, the first tooth T31 is engageable with only the outer link plates 16A. As seen in FIG. 25, the second tooth T32 is engageable with only the inner link plates 16B.

Fourth Embodiment

A bicycle drive train 410 comprising a bicycle sprocket assembly 412 in accordance with a fourth embodiment will be described below referring to FIGS. 26 to 29. The bicycle drive train 410 has the same structure as that of the bicycle drive train 10 except for the bicycle sprocket assembly 412. Thus, elements having substantially the same function as those in the above embodiments will be numbered the same here, and will not be described and/or illustrated again in detail here for the sake of brevity.

Figure 26:
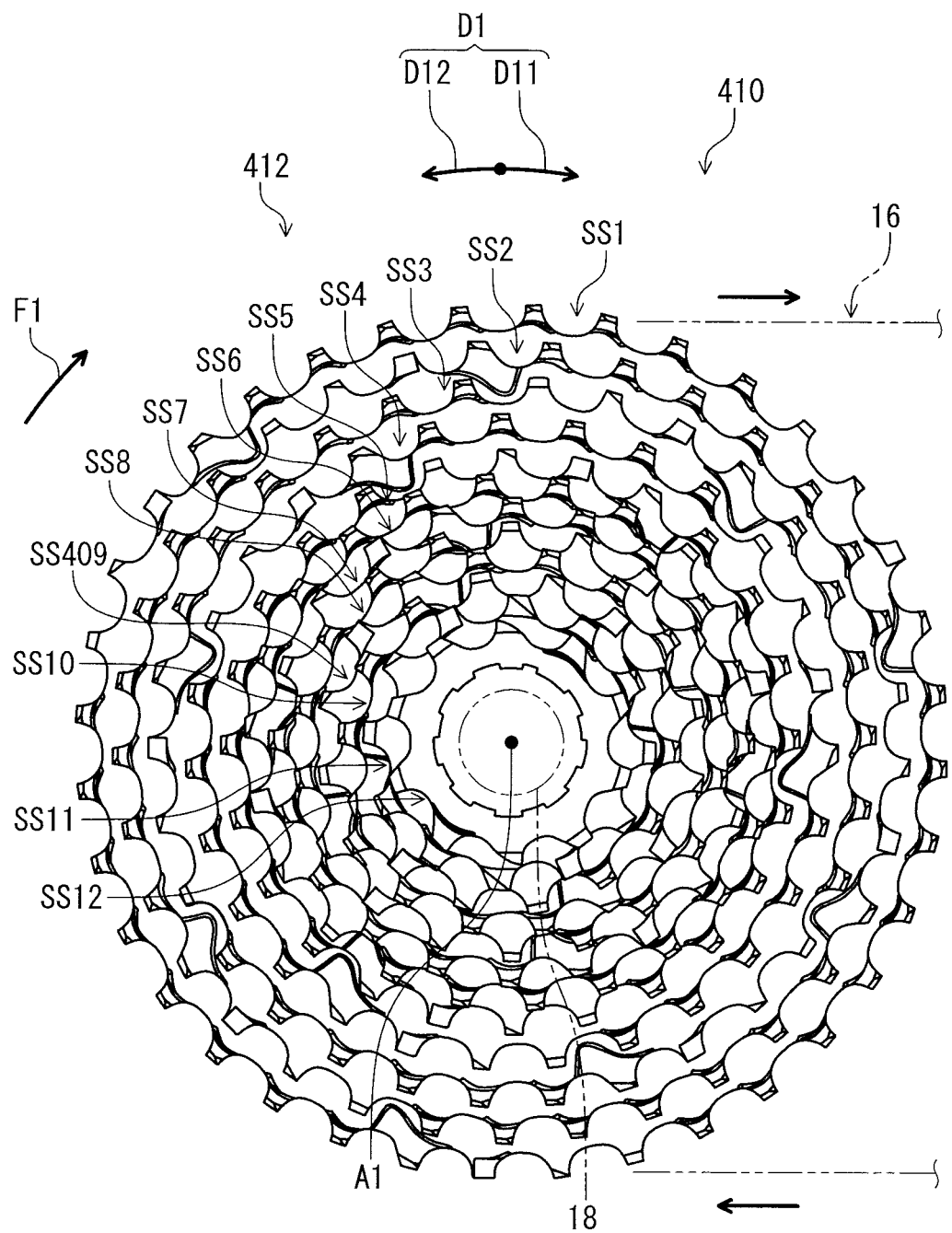
FIG. 26 is a side elevational view of a bicycle sprocket assembly of a bicycle drive train in accordance with a fourth embodiment.

As seen in FIG. 26, the bicycle sprocket assembly 412 comprises a ninth speed sprocket SS409. The ninth speed sprocket SS409 can correspond to the first sprocket. The bicycle sprocket assembly 412 has substantially the same structure as that of the bicycle sprocket assembly 12 of the first embodiment except for the ninth speed sprocket SS409.

Figure 27:
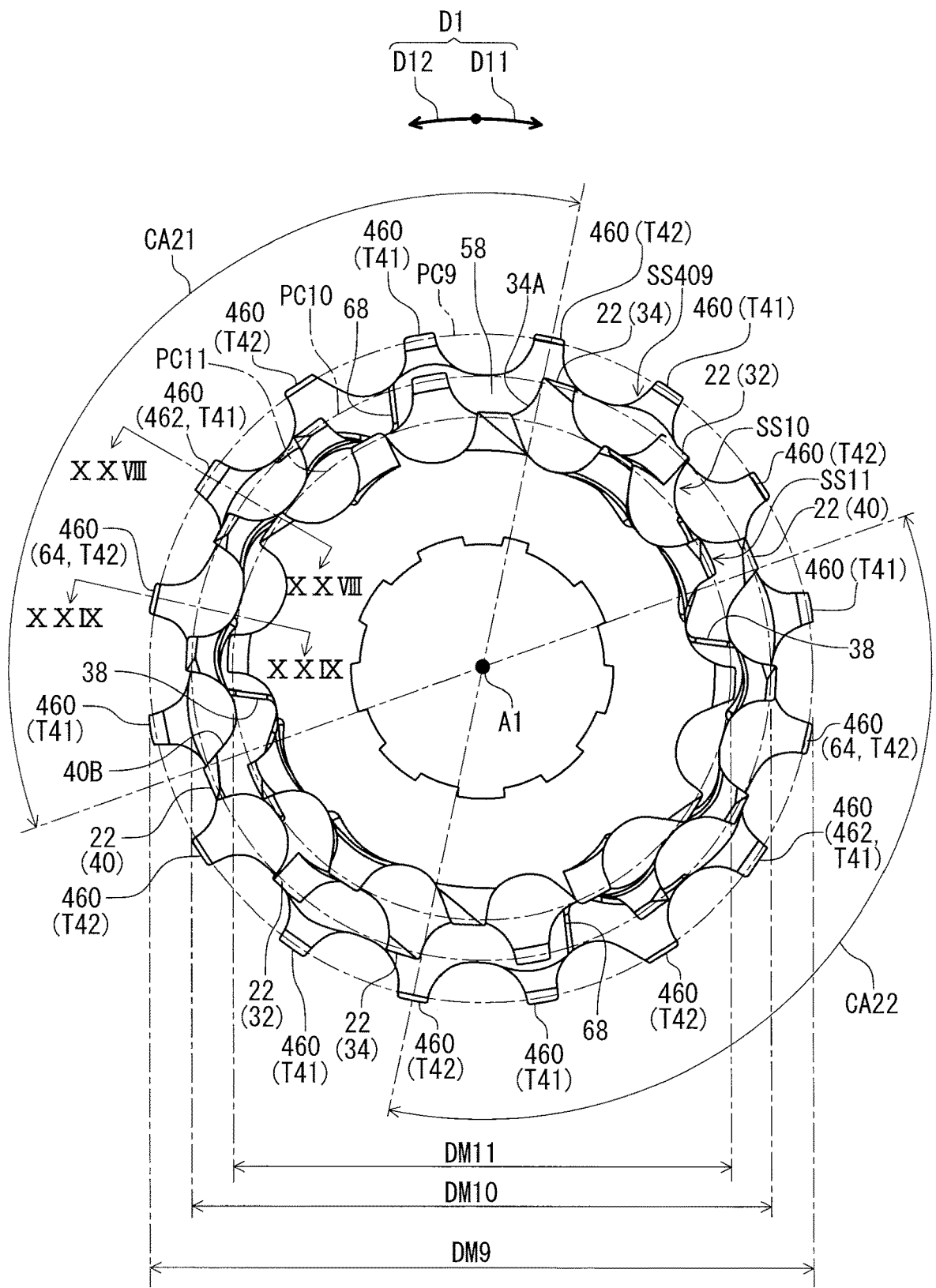
FIG. 27 is a partial side elevational view of a first sprocket of the bicycle sprocket assembly illustrated in FIG. 26.

As seen in FIG. 27, the ninth speed sprocket SS409 includes the ninth sprocket body 58 and a plurality of ninth sprocket teeth 460. The ninth sprocket teeth 460 have substantially the same structure as those of the ninth sprocket teeth 60 of the ninth speed sprocket S9 of the first embodiment. In this embodiment, the ninth sprocket teeth 460 include the large-sprocket downshifting tooth 462 to first receive the bicycle chain 16 from the tenth speed sprocket SS10 in the first chain phase state ST1 in which the bicycle chain 16 is shifted from the tenth speed sprocket SS10 to the ninth speed sprocket SS409. The large-sprocket downshifting tooth 462 has substantially the same structure as that of the large-sprocket downshifting tooth 62 of the ninth speed sprocket SS9 of the first embodiment. In this embodiment, the large-sprocket downshifting tooth 462 is engageable with only the outer link space 16A1 (FIG. 8) of the bicycle chain 16. Namely, the tenth speed sprocket SS10 has only the first chain phase state ST1 while the tenth speed sprocket SS10 has substantially the same structure as that of the tenth speed sprocket SS10 of the first embodiment. The large-sprocket downshifting tooth 462 is disposed in the circumferential area CA21 when viewed in the axial direction D2.

The ninth sprocket teeth 460 include at least one first tooth T41 and at least one second tooth T42. In this embodiment, the ninth sprocket teeth 460 include first teeth T41 and second teeth T42. The large-sprocket downshifting tooth 462 corresponds the first tooth T41. The additional large-sprocket downshifting tooth 64 corresponds to the second tooth T42.

Figure 28:
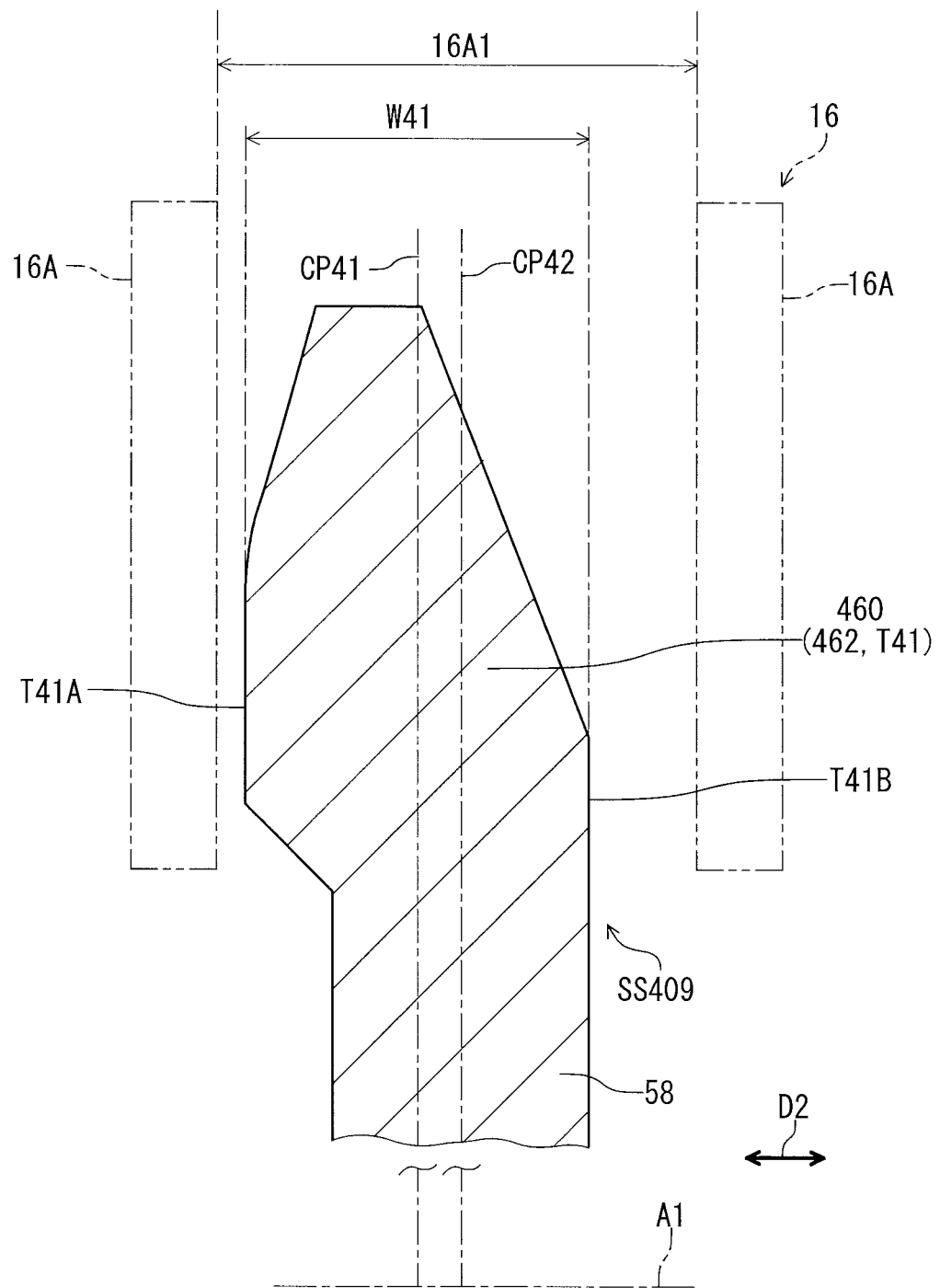
FIG. 28 is a cross-sectional view of the first sprocket taken along line XXVIII-XXVIII of FIG. 27.

As seen in FIG. 28, the at least one first tooth T41 has a first maximum axial width W41 and a first center plane CP41. The first maximum axial width W41 is defined in the axial direction D2 parallel to the rotational center axis A1. The first center plane CP41 is defined to bisect the first maximum axial width W41. The first tooth T41 includes a first chain-engagement surface T41A and a first additional chain-engagement surface T41B provided on a reverse side of the first chain-engagement surface T41A in the axial direction D2. The first maximum axial width W41 is defined between the first chain-engagement surface T41A and the first additional chain-engagement surface T41B in the axial direction D2.

Figure 29:
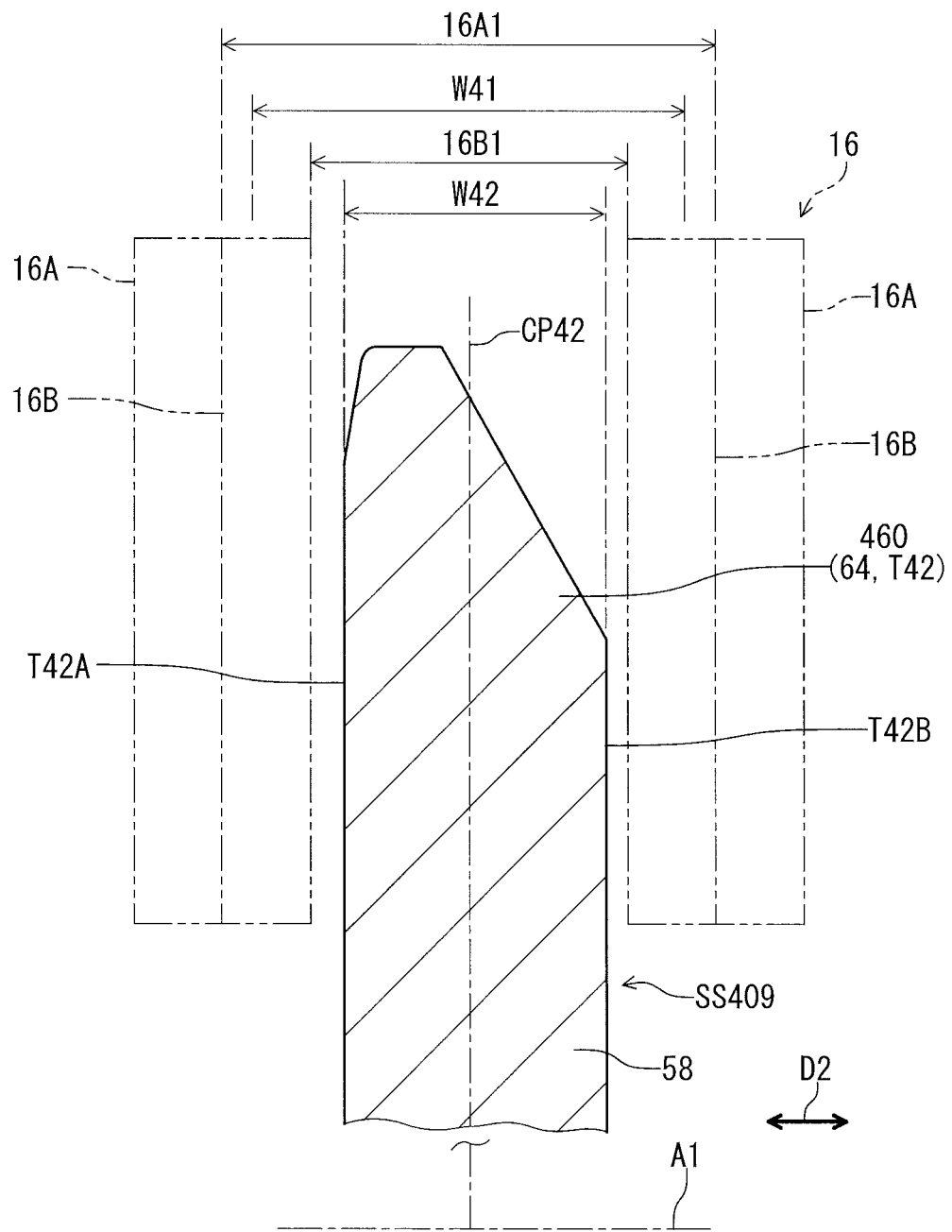
FIG. 29 is a cross-sectional view of the first sprocket taken along line XXIX-XXIX of FIG. 27.

As seen in FIG. 29, the second tooth T42 has the same structure as that of the second tooth T32 of the ninth speed sprocket SS309 of the third embodiment. The at least one second tooth T42 has a second maximum axial width W42 and a second center plane CP42. The second maximum axial width W42 is defined in the axial direction D2. The second center plane CP42 is defined to bisect the second maximum axial width W42. The second tooth T42 includes a second chain-engagement surface T42A and a second additional chain-engagement surface T42B provided on a reverse side of the second chain-engagement surface T42A in the axial direction D2. The second maximum axial width W42 is defined between the second chain-engagement surface T42A and the second additional chain-engagement surface T42B in the axial direction D2.

As seen in FIGS. 28 and 29, the first center plane CP41 is offset from the second center plane CP42 in the axial direction D2. Thus, as seen in FIG. 28, the first tooth T41 is engageable with only the outer link plates 16A. As seen in FIG. 29, the second tooth T42 is engageable with only the inner link plates 16B.

It will be apparent to those skilled in the bicycle field from the present disclosure that the structures of the bicycle sprocket assemblies 12, 212, 312, and 412 of the above embodiments can be combined with each other if needed and/or desired. The combination of the total number of teeth is not limited to the combinations shown in FIGS. 13 and 19. Other combinations can be applied to the bicycle sprocket assemblies 12, 212, 312, and 412 of the above embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle sprocket assembly comprising:
a first sprocket including:
  a first sprocket body;
  a plurality of first sprocket teeth extending radially outwardly from an outer periphery of the first sprocket body; and
  a first pitch circle having a first diameter;
a second sprocket including:
  a second sprocket body;
  second sprocket teeth extending radially outwardly from an outer periphery of the second sprocket body; and
  a second pitch circle having a second diameter that is smaller than the first diameter, the second sprocket being adjacent to the first sprocket without another sprocket between the first sprocket and the second sprocket in an axial direction parallel to a rotational center axis of the bicycle sprocket assembly,
the first sprocket teeth including
  a large-sprocket downshifting tooth to first receive a bicycle chain from the second sprocket in a first chain-phase-state in which the bicycle chain is shifted from the second sprocket to the first sprocket, and
  an additional large-sprocket downshifting tooth to first receive the bicycle chain from the second sprocket in a second chain-phase-state in which the bicycle chain is shifted from the second sprocket to the first sprocket, the second chain phase state being different from the first chain phase state, the additional large-sprocket downshifting tooth being adjacent to the large-sprocket downshifting tooth without another tooth between the large-sprocket downshifting tooth and the additional large-sprocket downshifting tooth, the additional large-sprocket downshifting tooth being disposed on an upstream side of the large-sprocket downshifting tooth in a driving rotational direction in which the bicycle sprocket assembly is rotated about the rotational center axis during pedaling,
the second sprocket teeth including
  a first small-sprocket downshifting tooth to facilitate a downshifting operation in which the bicycle chain is shifted from a third sprocket to the second sprocket, the third sprocket being adjacent to the second sprocket without another sprocket between the second sprocket and the third sprocket in the axial direction,
  a second small-sprocket downshifting tooth to facilitate a downshifting operation in which the bicycle chain is shifted from the third sprocket to the second sprocket, the second small-sprocket downshifting tooth being spaced apart from the first small-sprocket downshifting tooth in a circumferential direction with respect to the rotational center axis,
  a first adjacent tooth adjacent to the first small-sprocket downshifting tooth without another tooth between the first small-sprocket downshifting tooth and the first adjacent tooth in the circumferential direction, the first adjacent tooth being disposed on an upstream side of the first small-sprocket downshifting tooth in the driving rotational direction, and
  a second adjacent tooth adjacent to the second small-sprocket downshifting tooth without another tooth between the second small-sprocket downshifting tooth and the second adjacent tooth in the circumferential direction, the second adjacent tooth being disposed on a downstream side of the second small-sprocket downshifting tooth in the driving rotational direction, a circumferential area being defined from a driving surface of the first adjacent tooth to a non-driving surface of the second adjacent tooth in the driving rotational direction about the rotational center axis when viewed in the axial direction, the circumferential area having an angle equal to or smaller than 180 degrees about the rotational center axis, and the large-sprocket downshifting tooth being disposed in the circumferential area when viewed in the axial direction.

2. The bicycle sprocket assembly according to claim 1, wherein a total number of the second sprocket teeth is smaller than a total number of the first sprocket teeth by a tooth-number difference that is equal to or less than five.

3. The bicycle sprocket assembly according to claim 2, wherein the tooth-number difference is equal to three.

4. The bicycle sprocket assembly according to claim 2, wherein the tooth-number difference is equal to two.

5. The bicycle sprocket assembly according to claim 1, wherein a total number of the first sprocket teeth is equal to or less than 24.

6. The bicycle sprocket assembly according to claim 1, wherein the first sprocket teeth include
at least one first tooth having
a first maximum axial width defined in the axial direction, and
a first center plane defined to bisect the first maximum axial width, and
at least one second tooth having
a second maximum axial width defined in the axial direction, and
a second center plane defined to bisect the second maximum axial width, and
the first center plane is offset from the second center plane in the axial direction.

7. The bicycle sprocket assembly according to claim 1, further comprising the third sprocket comprising a third sprocket body and third sprocket teeth extending radially outwardly from an outer periphery of the third sprocket body, and
a total number of the third sprocket teeth is equal to or smaller than 10.

8. The bicycle sprocket assembly according to claim 1, further comprising a smallest sprocket having a minimum total number of sprocket teeth which is equal to or smaller than 10.

9. The bicycle sprocket assembly according to claim 1, further comprising a largest sprocket having a maximum total number of sprocket teeth which is equal to or larger than 46.

10. The bicycle sprocket assembly according to claim 9, wherein the maximum total number of sprocket teeth is equal to or larger than 50.

11. The bicycle sprocket assembly according to claim 1, wherein at least one of the first small-sprocket downshifting tooth and the second small-sprocket downshifting tooth is disposed outside the circumferential area when viewed in the axial direction.

12. The bicycle sprocket assembly according to claim 11, wherein the first small-sprocket downshifting tooth and the second small-sprocket downshifting tooth are disposed outside the circumferential area when viewed in the axial direction, the first small-sprocket downshifting tooth is disposed on a downstream side of the circumferential area in the driving rotational direction when viewed in the axial direction, and the second small-sprocket downshifting tooth is disposed on an upstream side of the circumferential area in the driving rotational direction when viewed in the axial direction.

13. A bicycle sprocket assembly comprising:

a first sprocket including:
a first sprocket body;
first sprocket teeth extending radially outwardly from an outer periphery of the first sprocket body, a total number of the first sprocket teeth being equal to or less than 24; and
a first pitch circle having a first diameter;
a second sprocket including:
a second sprocket body;
second sprocket teeth extending radially outwardly from an outer periphery of the second sprocket body; and
a second pitch circle having a second diameter that is smaller than the first diameter, the second sprocket being adjacent to the first sprocket without another sprocket between the first sprocket and the second sprocket in an axial direction parallel to a rotational center axis of the bicycle sprocket assembly,
the first sprocket teeth including
a large-sprocket downshifting tooth to first receive a bicycle chain from the second sprocket in a first chain phase state in which the bicycle chain is shifted from the second sprocket to the first sprocket, and
the second sprocket teeth including
a first small-sprocket downshifting tooth to facilitate a downshifting operation in which the bicycle chain is shifted from a third sprocket to the second sprocket, the third sprocket being adjacent to the second sprocket without another sprocket between the second sprocket and the third sprocket in the axial direction,
a second small-sprocket downshifting tooth to facilitate a downshifting operation in which the bicycle chain is shifted from the third sprocket to the second sprocket, the second small-sprocket downshifting tooth being spaced apart from the first small-sprocket downshifting tooth in a circumferential direction with respect to the rotational center axis,
a first adjacent tooth adjacent to the first small-sprocket downshifting tooth without another tooth between the first small-sprocket downshifting tooth and the first adjacent tooth in the circumferential direction, the first adjacent tooth being disposed on an upstream side of the first small-sprocket downshifting tooth in a driving rotational direction in which the bicycle sprocket assembly is rotated about the rotational center axis during pedaling, and a second adjacent tooth adjacent to the second small-sprocket downshifting tooth without another tooth between the second small-sprocket downshifting tooth and the second adjacent tooth in the circumferential direction, the second adjacent tooth being disposed on a downstream side of the second small-sprocket downshifting tooth in the driving rotational direction, a circumferential area being defined from a driving surface of the first adjacent tooth to a non-driving surface of the second adjacent tooth in the driving rotational direction when viewed in the axial direction, the circumferential area being equal to or smaller than 180 degrees, the large-sprocket downshifting tooth being disposed in the circumferential area when viewed in the axial direction, and at least one of the first small-sprocket downshifting tooth and the second small-sprocket downshifting tooth being disposed outside the circumferential area when viewed in the axial direction.

14. The bicycle sprocket assembly according to claim 13, wherein the first sprocket teeth include
at least one first tooth having a first maximum axial width defined in the axial direction, and
at least one second tooth having a second maximum axial width defined in the axial direction, and the first maximum axial width is larger than the second maximum axial width.

15. The bicycle sprocket assembly according to claim 13, wherein the first small-sprocket downshifting tooth and the second small-sprocket downshifting tooth are disposed outside the circumferential area when viewed in the axial direction, the first small-sprocket downshifting tooth is disposed on a downstream side of the circumferential area in the driving rotational direction when viewed in the axial direction, and the second small-sprocket downshifting tooth is disposed on an upstream side of the circumferential area in the driving rotational direction when viewed in the axial direction.

16. A bicycle sprocket assembly comprising:

a first sprocket including:
a first sprocket body; and
first sprocket teeth extending radially outwardly from an outer periphery of the first sprocket body, a total number of the first sprocket teeth being equal to or larger than 14, the first sprocket teeth including a reference tooth and a downshifting tooth to facilitate a downshifting operation in which a bicycle chain is shifted from a second sprocket to the first sprocket, the second sprocket being adjacent to the first sprocket without another sprocket between the first sprocket and the second sprocket in an axial direction parallel to a rotational center axis of the bicycle sprocket assembly, the reference tooth having a reference circumferential width defined in a circumferential direction with respect to the rotational center axis, the downshifting tooth having a circumferential width defined in the circumferential direction, the reference circumferential width and the circumferential width being defined on a first pitch circle of the first sprocket, the circumferential width being larger than the reference circumferential width, the first sprocket teeth including an additional downshifting tooth to facilitate a downshifting operation in which the bicycle chain is shifted from a second sprocket to the first sprocket, the additional downshifting tooth being adjacent to the downshifting tooth without another tooth between the downshifting tooth and the additional downshifting tooth, and the additional downshifting tooth being disposed on an upstream side of the downshifting tooth in a driving rotational direction in which the bicycle sprocket assembly is rotated about the rotational center axis during pedaling.

17. The bicycle sprocket assembly according to claim 16, wherein the circumferential width is equal to or larger than 3.6 mm.

18. The bicycle sprocket assembly according to claim 16, wherein the additional downshifting tooth is adjacent to the reference tooth without another tooth between the downshifting tooth and the reference tooth, and the additional downshifting tooth is disposed on a downstream side of the reference tooth in the driving rotational direction.

19. A bicycle drive train comprising:

the bicycle sprocket assembly according to claim 1 attached to a bicycle rear hub assembly;

a bicycle front sprocket; and the bicycle chain engaged with the bicycle front sprocket and the bicycle sprocket assembly to transmit a driving rotational force between the bicycle front sprocket and the bicycle sprocket assembly.

20. The bicycle drive train according to claim 19, wherein the bicycle front sprocket comprised a solitary bicycle front sprocket.

* * * * *